US012580848B2

(12) United States Patent (10) Patent No.: US 12,580,848 B2
Filsfils et al. (45) Date of Patent: Mar. 17, 2026

(54) SRV6 POLICY TYPE FOR PACKET PATH TRACING IN LARGE DIAMETER NETWORKS

(71) Applicant: Cisco Technology, Inc., San Jose, CA (US)

(72) Inventors: Clarence Filsfils, Brussels (BE);
Ahmed Abdelsalam, L'Aquila (IT);
Pablo Camarillo, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 498 days.

(21) Appl. No.: 18/157,002

(22) Filed: Jan. 19, 2023

(65) Prior Publication Data

US 2024/0250896 A1 Jul. 25, 2024

(51) Int. Cl.
*H04L 45/74* (2022.01)
*H04L 45/00* (2022.01)
(52) U.S. Cl.
CPC .............. *H04L 45/26* (2013.01); *H04L 45/34* (2013.01); *H04L 45/74* (2013.01)
(58) Field of Classification Search
CPC .......... H04L 45/26; H04L 45/34; H04L 45/74
See application file for complete search history.

(56) References Cited

U.S. PATENT DOCUMENTS

| | | | | |
|---|---|---|---|---|
| 2021/0243107 A1* | 8/2021 | Retana | .................... | H04L 45/34 |
| 2021/0266189 A1* | 8/2021 | Xie | .................... | H04L 12/4641 |
| 2022/0029916 A1 | 1/2022 | Filsfils et al. | | |

| | | | |
|---|---|---|---|
| 2022/0070085 A1 | 3/2022 | Ji | |
| 2022/0174011 A1 | 6/2022 | Filsfils et al. | |
| 2022/0329518 A1* | 10/2022 | Filsfils | .................... H04L 45/20 |

FOREIGN PATENT DOCUMENTS

| | | |
|---|---|---|
| WO | 2022/132208 | 6/2022 |
| WO | 2022/199486 | 9/2022 |

OTHER PUBLICATIONS

Filsfils et al., "Path Tracing in SRv6 Networks," www.ietf.org, Aug. 16, 2022, pp. 1-12.
International Search Report and Written Opinion for International Application No. PCT/US2024/010897, mailed May 8, 2024, 15 Pages.

* cited by examiner

*Primary Examiner* — Jae Y Lee
*Assistant Examiner* — Nam P. Cao
(74) *Attorney, Agent, or Firm* — Polsinelli P.C.

(57) ABSTRACT

The present disclosure provides systems and methods for enabling packet path tracing (PT) in large diameter networks that would otherwise exceed a hop limit imposed by hardware edit-depth limitations. Upon determining that a Midpoint Compressed Data (MCD) stack of a packet header is full, a PT Encapsulation and Copy (PEC) enabled midpoint node can apply an encapsulation protocol that generates a new header grouping that encapsulates a previous header grouping therein, copies information from the previous header grouping into the new header grouping, and adds a new MCD stack to the packet header for further population of path tracing data and to ensure that the packet remains along the intended path. The encapsulation protocol ensures that the new header grouping remains within the edit-depth of each midpoint node encountered by the packet. The path tracing information can be combined at a controller resulting in full path information for the packet.

20 Claims, 22 Drawing Sheets

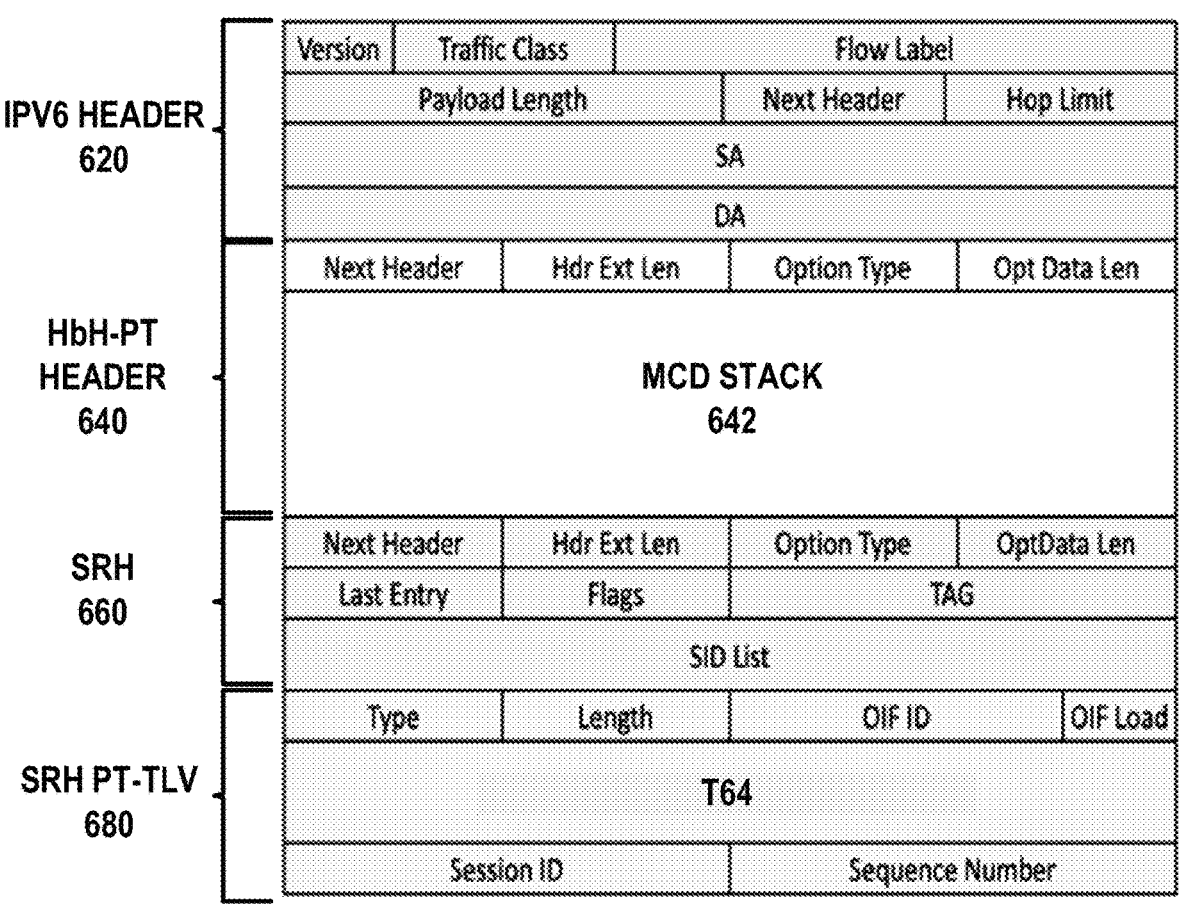
FIG. 6

700

710 → Receive packet at a midpoint node

720 → IPv6 Forwarding/
SR Endpoint Processing

730 → Compute OIF

740 → Compute MCD for inclusion in MCD stack
(e.g. MCD entry size = 3 bytes)

750 → Apply bit shifting to MCD stack by MCD entry
size (e.g., 3 bytes)

760 → Record MCD entry in MCD stack

770 → Forward packet on OIF

800

| BIT | 0 | 8 | 16 | 24 | 32 |
|-----|-----|-----|-----|-----|-----|

MCD STACK
(empty, all bits
set to zero)

| BYTE | | | | |
|------|------|------|------|------|
| 0 | 0x00 | 0x00 | 0x00 | 0x00 |
| 4 | 0x00 | 0x00 | 0x00 | 0x00 |
| 8 | 0x00 | 0x00 | 0x00 | 0x00 |
| 12 | 0x00 | 0x00 | 0x00 | 0x00 |
| 16 | 0x00 | 0x00 | 0x00 | 0x00 |
| 20 | 0x00 | 0x00 | 0x00 | 0x00 |
| 24 | 0x00 | 0x00 | 0x00 | 0x00 |
| 28 | 0x00 | 0x00 | 0x00 | 0x00 |
| 32 | 0x00 | 0x00 | 0x00 | 0x00 |

| BIT | 0 | 8 | 16 | 24 | 32 |
|-----|-----|-----|-----|-----|-----|

MCD STACK
(after 1 hop)

| BYTE | | | | |
|------|------|------|------|------|
| 0 | 810 | | | 0x00 |
| 4 | 0x00 | 0x00 | 0x00 | 0x00 |
| 8 | 0x00 | 0x00 | 0x00 | 0x00 |
| 12 | 0x00 | 0x00 | 0x00 | 0x00 |
| 16 | 0x00 | 0x00 | 0x00 | 0x00 |
| 20 | 0x00 | 0x00 | 0x00 | 0x00 |
| 24 | 0x00 | 0x00 | 0x00 | 0x00 |
| 28 | 0x00 | 0x00 | 0x00 | 0x00 |
| 32 | 0x00 | 0x00 | 0x00 | 0x00 |

| BIT | 0 | 8 | 16 | 24 | 32 |
|-----|---|---|----|----|----|
| BYTE | | | | | |
| 0 | 0x00 | 0x00 | 0x00 | 810 | |
| 4 | 810 | | 0x00 | 0x00 | |
| 8 | 0x00 | 0x00 | 0x00 | 0x00 | |
| 12 | 0x00 | 0x00 | 0x00 | 0x00 | |
| 16 | 0x00 | 0x00 | 0x00 | 0x00 | |
| 20 | 0x00 | 0x00 | 0x00 | 0x00 | |
| 24 | 0x00 | 0x00 | 0x00 | 0x00 | |
| 28 | 0x00 | 0x00 | 0x00 | 0x00 | |
| 32 | 0x00 | 0x00 | 0x00 | 0x00 | |

MCD STACK
(at hop #2, after applying bit shifting and prior to writing 2nd MCD entry)

| BIT | 0 | 8 | 16 | 24 | 32 |
|-----|---|---|----|----|----|
| BYTE | | | | | |
| 0 | 820 | | | 810 | |
| 4 | 810 | | 0x00 | 0x00 | |
| 8 | 0x00 | 0x00 | 0x00 | 0x00 | |
| 12 | 0x00 | 0x00 | 0x00 | 0x00 | |
| 16 | 0x00 | 0x00 | 0x00 | 0x00 | |
| 20 | 0x00 | 0x00 | 0x00 | 0x00 | |
| 24 | 0x00 | 0x00 | 0x00 | 0x00 | |
| 28 | 0x00 | 0x00 | 0x00 | 0x00 | |
| 32 | 0x00 | 0x00 | 0x00 | 0x00 | |

MCD STACK
(after 2 hops)

900

| SECOND IPV6 HEADER 920b | | | | |
|---|---|---|---|---|
| Version | Traffic Class | | Flow Label | |
| Payload Length | | Next Header | | Hop Limit |
| SA | | | | |
| DA | | | | |

| SECOND IPv6 HbH-PT HEADER 940b | | | |
|---|---|---|---|
| Next Header | Hdr Ext Len | Option Type | Opt Data Len |
| SECOND MCD STACK 942b | | | |

| SECOND SRH 960b | | | |
|---|---|---|---|
| Next Header | Hdr Ext Len | Option Type | OptData Len |
| Last Entry | Flags | TAG | |
| SID List | | | |

910b

| FIRST IPV6 HEADER 920a | | | | |
|---|---|---|---|---|
| Version | Traffic Class | | Flow Label | |
| Payload Length | | Next Header | | Hop Limit |
| SA | | | | |
| DA | | | | |

| FIRST IPv6 HbH-PT HEADER 940a | | | |
|---|---|---|---|
| Next Header | Hdr Ext Len | Option Type | Opt Data Len |
| FIRST MCD STACK 942a | | | |

| FIRST SRH 960a | | | |
|---|---|---|---|
| Next Header | Hdr Ext Len | Option Type | OptData Len |
| Last Entry | Flags | TAG | |
| SID List | | | |

910a

| SRH PT-TLV 980 | | | | |
|---|---|---|---|---|
| Type | Length | OIF ID | | OIF Load |
| T64 | | | | |
| Session ID | | Sequence Number | | |

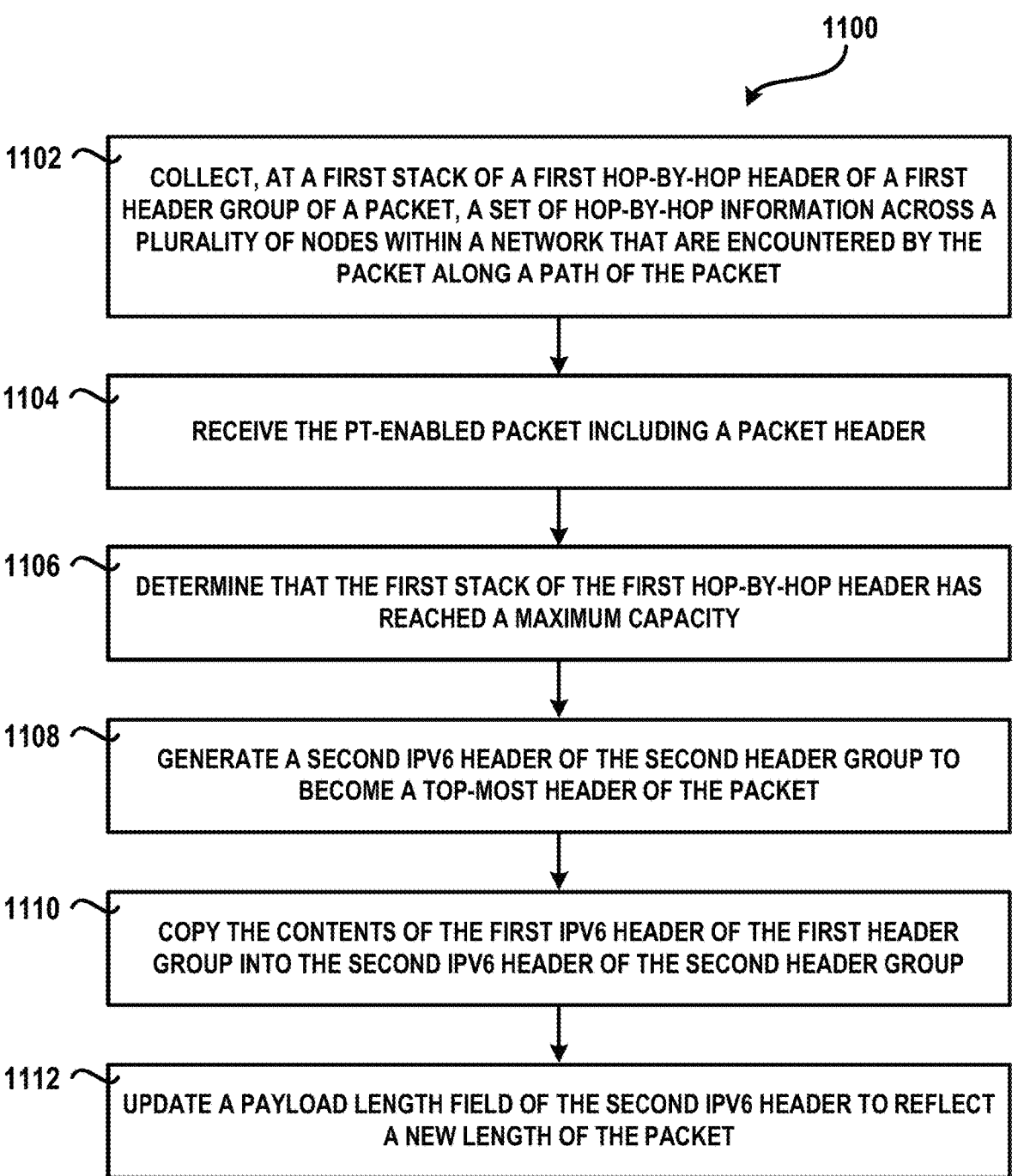

1102 — COLLECT, AT A FIRST STACK OF A FIRST HOP-BY-HOP HEADER OF A FIRST HEADER GROUP OF A PACKET, A SET OF HOP-BY-HOP INFORMATION ACROSS A PLURALITY OF NODES WITHIN A NETWORK THAT ARE ENCOUNTERED BY THE PACKET ALONG A PATH OF THE PACKET

1104 — RECEIVE THE PT-ENABLED PACKET INCLUDING A PACKET HEADER

1106 — DETERMINE THAT THE FIRST STACK OF THE FIRST HOP-BY-HOP HEADER HAS REACHED A MAXIMUM CAPACITY

1108 — GENERATE A SECOND IPV6 HEADER OF THE SECOND HEADER GROUP TO BECOME A TOP-MOST HEADER OF THE PACKET

1110 — COPY THE CONTENTS OF THE FIRST IPV6 HEADER OF THE FIRST HEADER GROUP INTO THE SECOND IPV6 HEADER OF THE SECOND HEADER GROUP

1112 — UPDATE A PAYLOAD LENGTH FIELD OF THE SECOND IPV6 HEADER TO REFLECT A NEW LENGTH OF THE PACKET

FIG. 11A 1100 (cont'd)

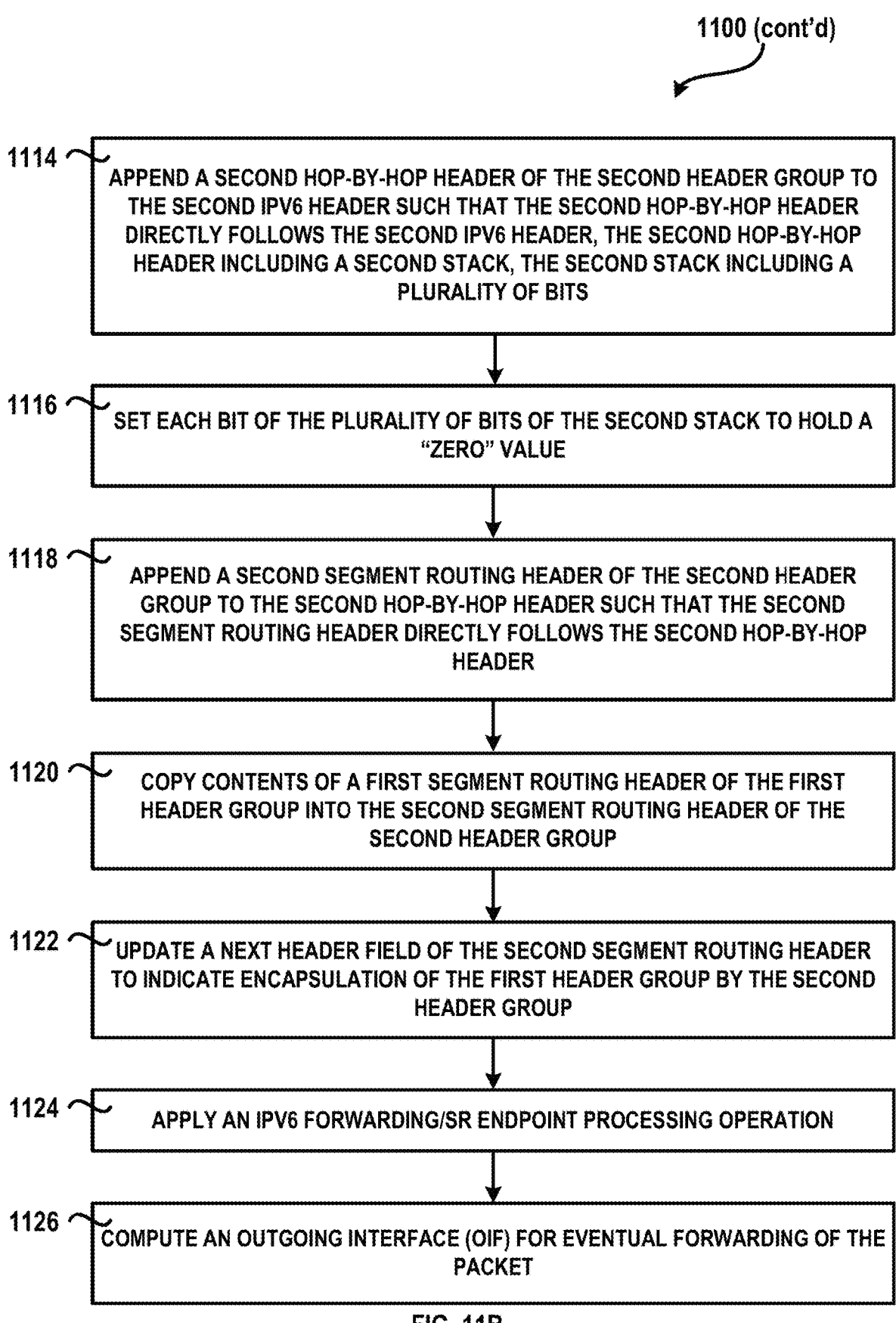

1114 — APPEND A SECOND HOP-BY-HOP HEADER OF THE SECOND HEADER GROUP TO THE SECOND IPV6 HEADER SUCH THAT THE SECOND HOP-BY-HOP HEADER DIRECTLY FOLLOWS THE SECOND IPV6 HEADER, THE SECOND HOP-BY-HOP HEADER INCLUDING A SECOND STACK, THE SECOND STACK INCLUDING A PLURALITY OF BITS

1116 — SET EACH BIT OF THE PLURALITY OF BITS OF THE SECOND STACK TO HOLD A "ZERO" VALUE

1118 — APPEND A SECOND SEGMENT ROUTING HEADER OF THE SECOND HEADER GROUP TO THE SECOND HOP-BY-HOP HEADER SUCH THAT THE SECOND SEGMENT ROUTING HEADER DIRECTLY FOLLOWS THE SECOND HOP-BY-HOP HEADER

1120 — COPY CONTENTS OF A FIRST SEGMENT ROUTING HEADER OF THE FIRST HEADER GROUP INTO THE SECOND SEGMENT ROUTING HEADER OF THE SECOND HEADER GROUP

1122 — UPDATE A NEXT HEADER FIELD OF THE SECOND SEGMENT ROUTING HEADER TO INDICATE ENCAPSULATION OF THE FIRST HEADER GROUP BY THE SECOND HEADER GROUP

1124 — APPLY AN IPV6 FORWARDING/SR ENDPOINT PROCESSING OPERATION

1126 — COMPUTE AN OUTGOING INTERFACE (OIF) FOR EVENTUAL FORWARDING OF THE PACKET

FIG. 11B 1100 (cont'd)

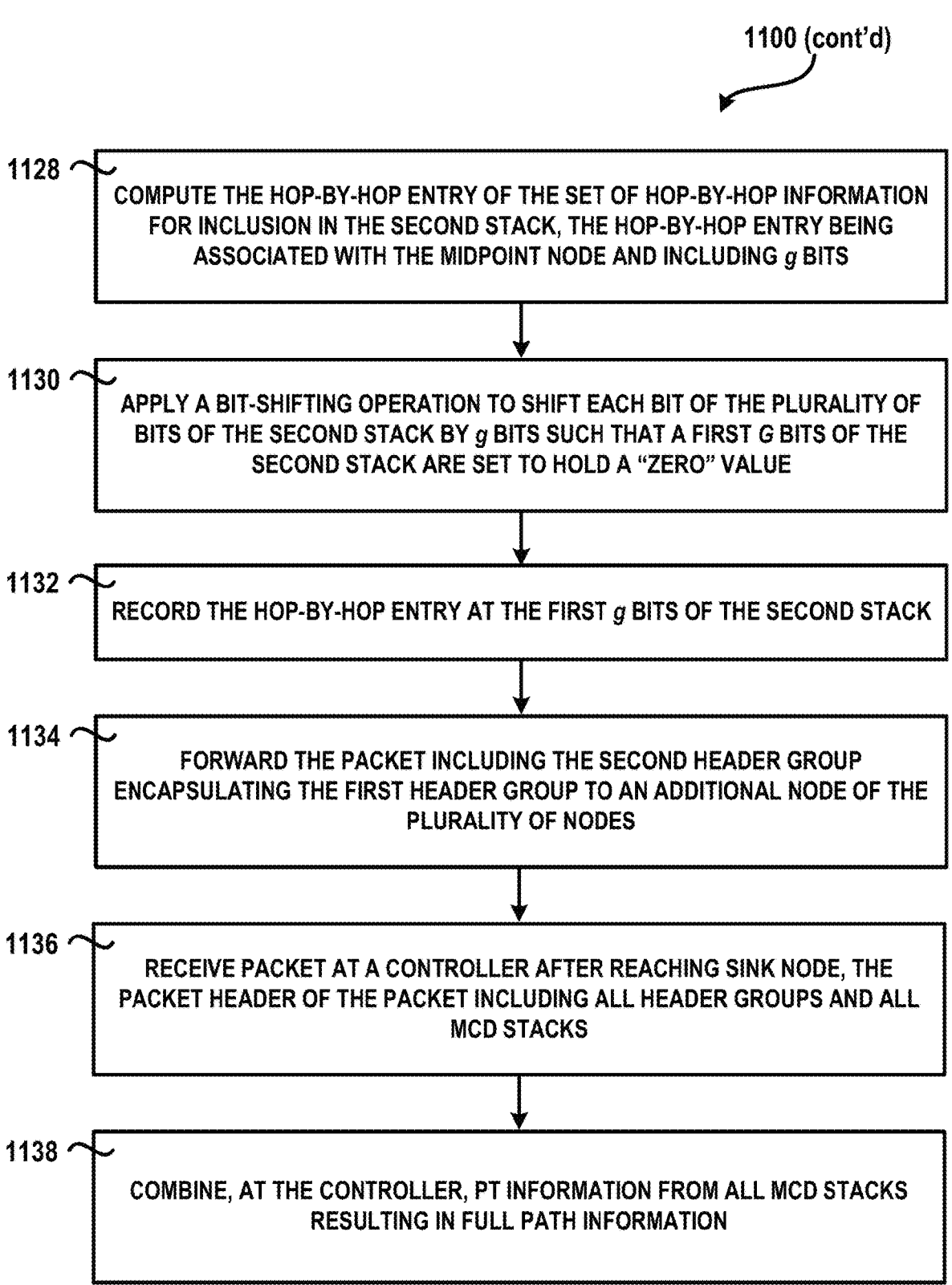

1128  COMPUTE THE HOP-BY-HOP ENTRY OF THE SET OF HOP-BY-HOP INFORMATION FOR INCLUSION IN THE SECOND STACK, THE HOP-BY-HOP ENTRY BEING ASSOCIATED WITH THE MIDPOINT NODE AND INCLUDING $g$ BITS

1130  APPLY A BIT-SHIFTING OPERATION TO SHIFT EACH BIT OF THE PLURALITY OF BITS OF THE SECOND STACK BY $g$ BITS SUCH THAT A FIRST G BITS OF THE SECOND STACK ARE SET TO HOLD A "ZERO" VALUE

1132  RECORD THE HOP-BY-HOP ENTRY AT THE FIRST $g$ BITS OF THE SECOND STACK

1134  FORWARD THE PACKET INCLUDING THE SECOND HEADER GROUP ENCAPSULATING THE FIRST HEADER GROUP TO AN ADDITIONAL NODE OF THE PLURALITY OF NODES

1136  RECEIVE PACKET AT A CONTROLLER AFTER REACHING SINK NODE, THE PACKET HEADER OF THE PACKET INCLUDING ALL HEADER GROUPS AND ALL MCD STACKS

1138  COMBINE, AT THE CONTROLLER, PT INFORMATION FROM ALL MCD STACKS RESULTING IN FULL PATH INFORMATION

OUTER NEST
1202

1220m — mᵗʰ IPv6 HEADER

PL

1240m — mᵗʰ IPv6 HbH-PT HEADER mᵗʰ MCD STACK
1242m mᵗʰ HEADER GROUP
1210m

NH

1260m — mᵗʰ SRH

INNER NESTS
1204 lᵗʰ HEADER GROUP 1210l lᵗʰ INNER NEST
1204l

[...]

1ˢᵗ HEADER GROUP 1210a

1ˢᵗ INNER NEST
1204a

SRH PT-TLV

SRV6 POLICY TYPE FOR PACKET PATH TRACING IN LARGE DIAMETER NETWORKS

TECHNICAL FIELD

The subject matter of this disclosure relates in general to the field of computer networking, and more particularly, to systems and methods for tracing and monitoring data packets as they traverse through a network to optimize network performance.

BACKGROUND

The Segment Routing over IPv6 (SRv6) Network Programming framework enables a network operator or an application to specify a packet processing program by encoding a sequence of instructions in the IPV6 packet header. Each instruction is implemented on one or several nodes in the network and identified by an SRv6 Segment Identifier in the packet. SRv6 has been proposed to replace GPRS Transport Protocol for carrying user data (GTP-U). SRv6 requires mobile and network operators to implement a network monitoring mechanism for purposes of applying network routing policies such as Ultra-Reliable Low-Latency Communication (URLLC). Path Tracing, typically referred to as PT, provides a record of the packet path; however current PT implementations have restrictions on how many midpoints can be recorded along the packet path based on edit-depth capabilities of current Application Specific Integrated Circuits (ASICS).

BRIEF DESCRIPTION OF THE FIGURES

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 shows an example path-tracing enabled packet header according to aspects of the present disclosure;

FIGS. 8A-8D show showing updating a midpoint-compressed data stack of a path-tracing enabled packet header across a plurality of hops according to aspects of the present disclosure;

FIGS. 9A and 9B show a path-tracing enabled packet header following application of an encapsulation protocol according to aspects of the present disclosure;

FIGS. 11A-11C show a method for updating a path-tracing enabled packet header including an encapsulation protocol for path-tracing across large-diameter networks according to aspects of the present disclosure;

DESCRIPTION OF EXAMPLE EMBODIMENTS

Figure 1:
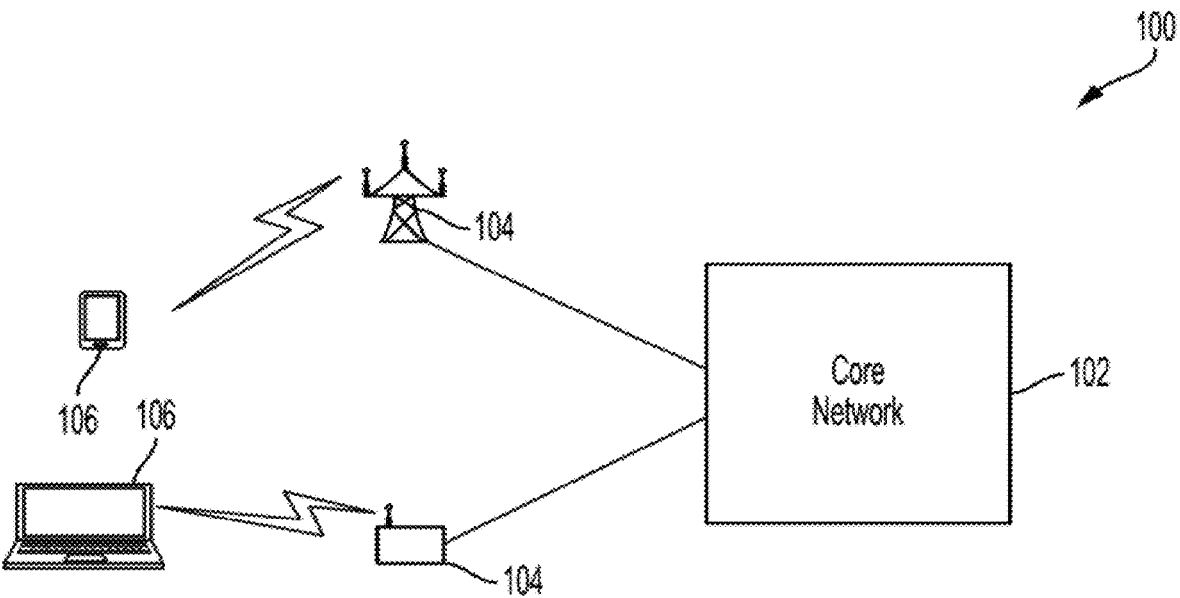
FIG. 1 illustrates an example network, according to an aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Current hardware limits how much path tracing information can be collected within a packet header of a packet. The present disclosure provides systems and methods for enabling packet path tracing (PT) in large diameter networks that would otherwise exceed a hop limit imposed by hardware edit-depth limitations.

In one aspect, a network device includes memory having computer-readable instructions stored therein and one or more processors. The one or more processors are configured to execute the computer-readable instructions to: collect, at a first stack of a first hop-by-hop header of a first header group of a packet, a set of hop-by-hop information across a plurality of nodes within a network that are encountered by the packet along a path of the packet; determine, at a midpoint node of the plurality of nodes, that the first stack of the first hop-by-hop header has reached a maximum capacity; and generate, based on the determination that the first stack of the first hop-by-hop header has reached the maximum capacity, a second header group that encapsulates the first header group. To generate the second header group, the one or more processors can be configured to execute the computer-readable instructions to: generate a second IPv6 header of the second header group to become a top-most header of the packet; append a second hop-by-hop header of the second header group to the second IPV6 header such that the second hop-by-hop header directly follows the second IPV6 header, the second hop-by-hop header including a second stack, the second stack including a plurality of bits; set each bit of the plurality of bits of the second stack to hold a "zero" value; and append a second segment routing header of the second header group to the second hop-by-hop header such that the second segment routing header directly follows the second hop-by-hop header. The one or more processors can further be configured to execute the computer-readable instructions to update the second stack of the second header group to include a hop-by-hop entry of the set of hop-by-hop information for the midpoint node of the plurality of nodes and forward the packet including the second header group encapsulating the first header group to an additional node of the plurality of nodes.

In a further aspect, the one or more processors can further be configured to execute the computer-readable instructions to copy contents of a first IPV6 header of the first header group into the second IPv6 header of the second header group; update a payload length field of the second IPv6 header to reflect a new length of the packet; copy contents of a first segment routing header of the first header group into the second segment routing header of the second header group; and update a next header field of the second segment routing header to indicate encapsulation of the first header group by the second header group.

In one aspect, one or more non-transitory computer-readable media includes computer-readable instructions, which when executed by one or more processors of a midpoint node of a network, cause the midpoint node to: collect, at a first stack of a first hop-by-hop header of a first header group of a packet, a set of hop-by-hop information across a plurality of nodes within a network that are encountered by the packet along a path of the packet; determine, at a midpoint node of the plurality of nodes, that the first stack of the first hop-by-hop header has reached a maximum capacity; and generate, based on the determination that the first stack of the first hop-by-hop header has reached the maximum capacity, a second header group that encapsulates the first header group. To generate the second header group, the computer-readable instructions can further cause the midpoint node to: generate a second IPV6 header of the second header group to become a top-most header of the packet; append a second hop-by-hop header of the second header group to the second IPV6 header such that the second hop-by-hop header directly follows the second IPv6 header, the second hop-by-hop header including a second stack, the second stack including a plurality of bits; set each bit of the plurality of bits of the second stack to hold a "zero" value; and append a second segment routing header of the second header group to the second hop-by-hop header such that the second segment routing header directly follows the second hop-by-hop header. The computer-readable instructions can further cause the midpoint node to update the second stack of the second header group to include a hop-by-hop entry of the set of hop-by-hop information for the midpoint node of the plurality of nodes and forward the packet including the second header group encapsulating the first header group to an additional node of the plurality of nodes.

In one aspect, a method includes collecting, at a first stack of a first hop-by-hop header of a first header group of a packet, a set of hop-by-hop information across a plurality of nodes within a network that are encountered by the packet along a path of the packet; determining, at a midpoint node of the plurality of nodes, that the first stack of the first hop-by-hop header has reached a maximum capacity; and generating, based on the determination that the first stack of the first hop-by-hop header has reached the maximum capacity, a second header group that encapsulates the first header group. The step of generating the second header group can include: generating a second IPv6 header of the second header group to become a top-most header of the packet; appending a second hop-by-hop header of the second header group to the second IPv6 header such that the second hop-by-hop header directly follows the second IPV6 header, the second hop-by-hop header including a second stack, the second stack including a plurality of bits; setting each bit of the plurality of bits of the second stack to hold a "zero" value; and appending a second segment routing header of the second header group to the second hop-by-hop header such that the second segment routing header directly follows the second hop-by-hop header. The method can further include updating the second stack of the second header group to include a hop-by-hop entry of the set of hop-by-hop information for the midpoint node of the plurality of nodes and forwarding the packet including the second header group encapsulating the first header group to an additional node of the plurality of nodes.

DETAILED DESCRIPTION

The disclosure begins with a description of various types of networks in which examples of the packet tracing mechanisms of the present disclosure can be implemented. Such networks can include, but are not limited to, a network (an example of which will be described with reference to FIGS. 1 and 2) and an enterprise network (e.g., a 5G network, an example of which will be described with reference to FIG. 3).

FIG. 1 illustrates an example network including devices within a packet delivery path, according to an aspect of the present disclosure. Network 100 is an example mobile network that may include a core network component 102, which may be an LTE or 5G core network with nodes and/or devices with packet delivery paths larger than can be included within the edit-depth of current ASICS, with an example 5G network being described below with reference to FIG. 2. In addition to core network 102, mobile network 100 also includes one or more base stations (e.g., a macro e-nodeB, micro base station for LTE or a gNode-B) or one or more routers (e.g., 5G enabled routers), depicted as access points 104 in FIG. 1. For purposes of the present disclosure, it is assumed that each of APs 110 can be a LTE and/or a 5G small cell transport router or AP. In one example, such APs 110 can have integrated Wi-Fi capabilities that support both cellular wireless connectivity and Wi-Fi connectivity to devices connected thereto. However, network 100 can also have Wi-Fi only APs. APs 110 can be any known or to be developed AP having LTE/5G and Wi-Fi integrated capabilities such as those designed and manufactured by Cisco Technology, Inc. of San Jose, CA.

One or more endpoint devices such as devices 106, which may be any type of known or to be developed device (e.g., a mobile phone, a laptop, a tablet, an Internet of Things (IoT) device and/or any other device or equipment with cellular connectivity), may connect to mobile network 100 and communicate with other endpoint devices, servers, etc., via mobile network 100. These endpoint devices can send and/or receive packets using a packet encapsulation technique described more fully herein that allows packet tracing for packet paths larger than a threshold number of hops (e.g., an encapsulation technique that collects hop-by-hop information after a first stack within an IP packet has reached maximum capacity).

Figure 2:
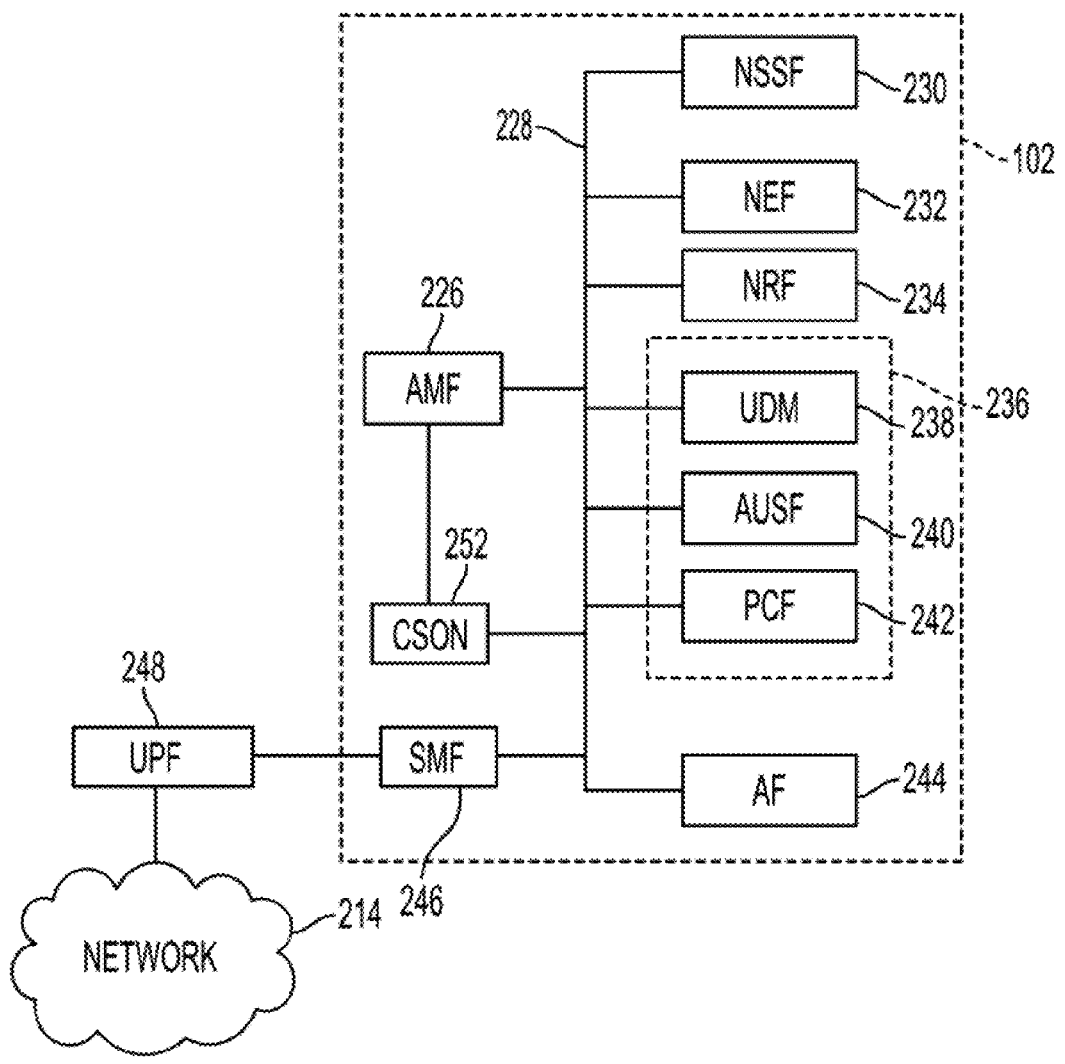
FIG. 2 illustrates an example of a 5G packet core of network of FIG. 1, according to an aspect of the present disclosure.

FIG. 2 illustrates an example of a 5G packet core of the example network of FIG. 1, according to an aspect of the present disclosure. While FIG. 2 illustrates a 5G packet core as an example packet core of network 100 of FIG. 1, such packet core is not limited to 5G but can be a 4G, LTE packet core, etc. as well. Current path tracing implementations allow the measurement of paths up to a certain number of midpoints between source and sink nodes. This limitation is based on edit-depth capabilities of current ASICS.

While current hardware capabilities in terms of number of hops can cover many deployment scenarios, there are many cases where the network diameter is much larger than the number of hops supported by current hardware capabilities. For example, network 100 may have some paths in the network 100 with a number of hops equal to H where H is larger than a number of hops supported by current hardware capabilities. The encapsulation technique allows the measurement of these types of large paths.

In the example illustrated in FIG. 2, core network 102 is a 5G core network having logical components. Example components include various network functions implemented via one or more dedicated and/or distributed servers (e.g., can be cloud based). 5G core network 102 can be highly flexible, modular and/or scalable. It can include many functions including network slicing. It offers distributed cloud-based functionalities, Network functions virtualization (NFV) and Software Defined Networking (SDN) capabilities.

For example and as shown in FIG. 2, core network 102 has Application and Mobility Management Function (AMF) 226 and bus 228 connecting various servers providing different example functionalities. For example, bus 228 can connect AMF 226 to Network Slice Selection Function (NSSF) 230, Network Exposure Function (NEF) 232, Network Repository Function (NRF) 234, Unified Data Control (UDC) 236 (which itself can include example functions including Unified Data Management (UDM) 238, Authentication Server Function (AUSF) 240, Policy Control Function (PCF) 242), Application Function (AF) 244 and Session Management Function (SMF) 246. Various components of core network 102, examples of which are described above, provide known or to be developed functionalities for operation of 5G networks including, but not limited to, device registration, attachment and authentication, implementing network policies, billing policies, etc.

Furthermore, as shown in FIG. 2, SMF 246 is connected to User Plane Function (UPF) 248, which in turn connects core network 102 and one or more of devices 106 via network 214.

While FIG. 2 illustrates an example structure and components of core network 102, the present disclosure is not limited thereto. Core network 102 can include any other number of known or to be developed logical functions and components and/or can have other known or to be developed architecture.

Furthermore, core network 102 can in some embodiments have a centralized Self Organizing Network (CSON) function/server 252 connected to AMF 226. CSON server 252 can have a dedicated server for performing functionalities thereof (e.g., management of device registrations, load balancing, integrated access backhaul, etc.).

With a mobile network as one example of a network in which SRv6 based tracing mechanism of the present application can be applied, another example network will now be described with reference to FIG. 3.

Figure 3:
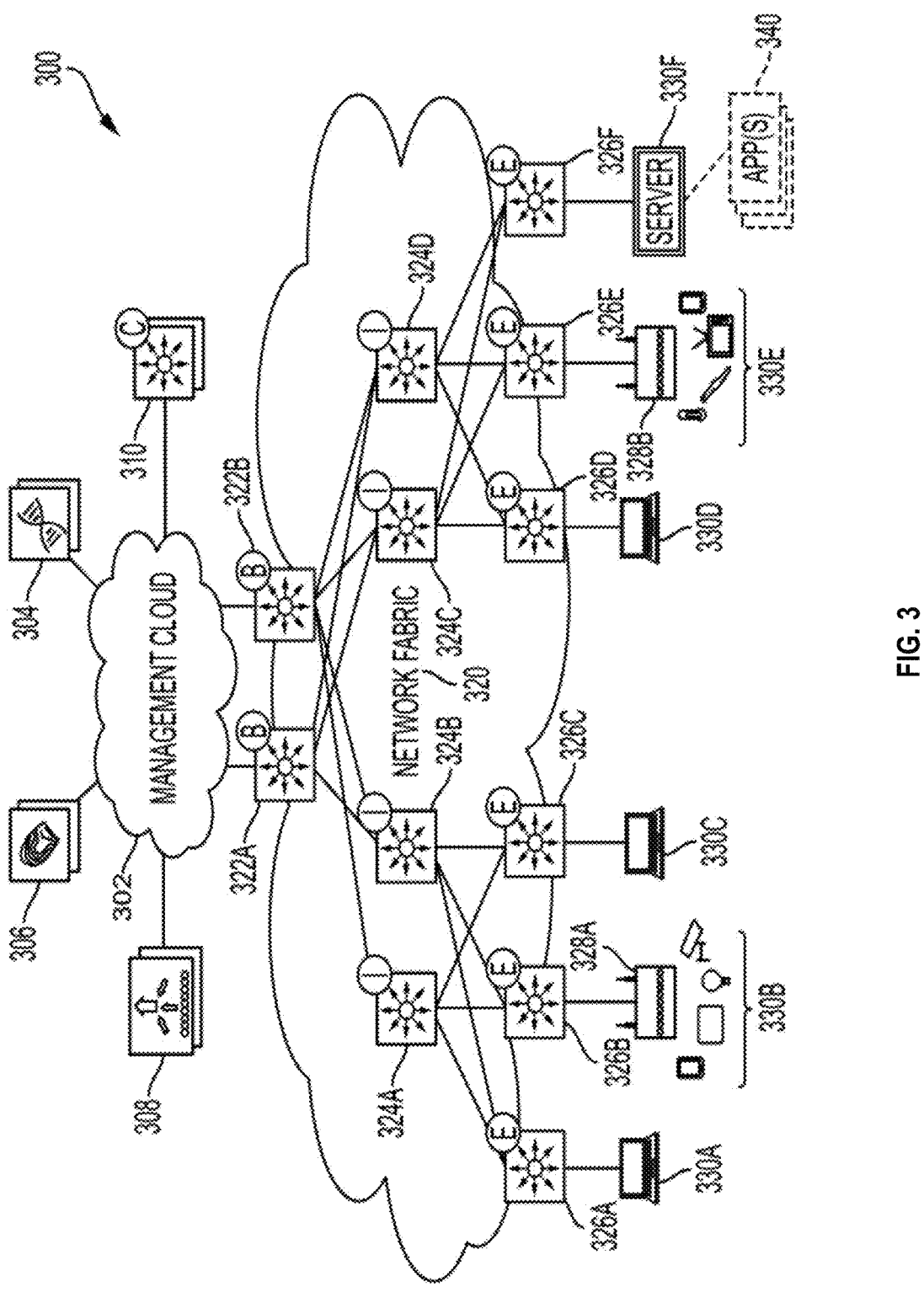
FIG. 3 illustrates an example of a physical topology of a standalone enterprise network in accordance with one aspect of the present disclosure.

FIG. 3 illustrates an example of a physical topology of an enterprise network in accordance with one aspect of the present disclosure. It should be understood that, for the enterprise network 300 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 300 can include any number or type of resources, which can be accessed and utilized by endpoints or network devices. The illustrations and examples provided herein are for clarity and simplicity.

In this example, the enterprise network 300 includes a management cloud 302 and a network fabric 320. Although shown as an external network or cloud to the network fabric 320 in this example, the management cloud 302 may alternatively or additionally reside on the premises of an organization or in a colocation center (in addition to being hosted by a cloud provider or similar environment). The management cloud 302 can provide a central management plane for building and operating the network fabric 320. The management cloud 302 can be responsible for forwarding configuration and policy distribution, as well as device management and analytics. The management cloud 302 can comprise one or more network controller appliances 304, one or more authentication, authorization, and accounting (AAA) appliances 306, one or more wireless local area network controllers (WLCs) 308, and one or more fabric control plane nodes 310. In other example embodiments, one or more elements of the management cloud 302 may be co-located with the network fabric 320.

The network controller appliance(s) 304 can function as the command and control system for one or more network fabrics, and can house automated workflows for deploying and managing the network fabric(s). The network controller appliance(s) 304 can include automation, design, policy, provisioning, and assurance capabilities, among others, as discussed further below with respect to FIG. 2. In some example embodiments, one or more Cisco Digital Network Architecture (Cisco DNA™) appliances can operate as the network controller appliance(s) 304.

The AAA appliance(s) 306 can control access to computing resources, facilitate enforcement of network policies, audit usage, and provide information necessary to bill for services. The AAA appliance can interact with the network controller appliance(s) 304 and with databases and directories containing information for users, devices, things, policies, billing, and similar information to provide authentication, authorization, and accounting services. In some example embodiments, the AAA appliance(s) 306 can utilize Remote Authentication Dial-In User Service (RADIUS) or Diameter to communicate with devices and applications. In some example embodiments, one or more Cisco® Identity Services Engine (ISE) appliances can operate as the AAA appliance(s) 306.

The WLC(s) 308 can support fabric-enabled access points attached to the network fabric 320, handling traditional tasks associated with a WLC as well as interactions with the fabric control plane for wireless endpoint registration and roaming. In some example embodiments, the network fabric 320 can implement a wireless deployment that moves data-plane termination (e.g., SRv6) from a centralized location (e.g., with previous overlay Control and Provisioning of Wireless Access Points (CAPWAP) deployments) to an access point/ fabric edge node. This can enable distributed forwarding and distributed policy application for wireless traffic while retaining the benefits of centralized provisioning and administration. In some example embodiments, one or more Cisco® Wireless Controllers, Cisco® Wireless LAN, and/or other Cisco DNA™-ready wireless controllers can operate as the WLC(s) 308.

The network fabric 320 can comprise fabric border nodes 322A and 322B (collectively, 322), fabric intermediate nodes 324A-D (collectively, 324), and fabric edge nodes 326A-F (collectively, 326). Although the fabric control plane node(s) 310 are shown to be external to the network fabric 320 in this example, in other example embodiments, the fabric control plane node(s) 310 may be co-located with the network fabric 320. In example embodiments where the fabric control plane node(s) 310 are co-located with the network fabric 320, the fabric control plane node(s) 310 may comprise a dedicated node or set of nodes or the functionality of the fabric control node(s) 310 may be implemented by the fabric border nodes 322.

The fabric control plane node(s) 310 can serve as a central database for tracking all users, devices, and things as they attach to the network fabric 320, and as they roam around. The fabric control plane node(s) 310 can allow network infrastructure (e.g., switches, routers, WLCs, etc.) to query the database to determine the locations of users, devices, and things attached to the fabric. In other embodiments, a flood and learn mechanism can be used to determine device locations. In this manner, the fabric control plane node(s) 310 can operate as a single source of truth about where every endpoint attached to the network fabric 320 is located at any point in time. In addition to tracking specific endpoints (e.g., /32 address for IPV4, /428 address for IPv5, etc.), the fabric control plane node(s) 310 can also track larger summarized routers (e.g., IP/mask). This flexibility can help in summarization across fabric sites and improve overall scalability.

The fabric border nodes 322A-B can connect the network fabric 320 to traditional Layer 3 networks (e.g., non-fabric networks) or to different fabric sites. The fabric border nodes 322A-B can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 322A-B can also exchange reachability and policy information with fabric control plane nodes of different fabric sites. The fabric border nodes 322A-B also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 324A-D can in some embodiments operate as pure Layer 3 forwarders that connect the fabric border nodes 322A-B to the fabric edge nodes 326A-F and provide the Layer 3 underlay for fabric overlay traffic.

The fabric edge nodes 326A-F can connect endpoints to the network fabric 320 and can encapsulate/decapsulate and forward traffic from these endpoints to and from the network fabric 320. The fabric edge nodes 326A-F may operate at the perimeter of the network fabric 320 and can be the first points for attachment of users, devices, and things and the implementation of policy and path tracing. In some example embodiments, the network fabric 320 can also include fabric extended nodes (not shown) for attaching downstream non-fabric Layer 2 network devices to the network fabric 320 and thereby extend the network fabric 320. For example, extended nodes can be small switches (e.g., compact switch, industrial Ethernet switch, building automation switch, etc.) which connect to the fabric edge nodes 326A-F via Layer 2. Devices or things connected to the fabric extended nodes can use the fabric edge nodes 326A-F for communication to outside subnets.

In some example embodiments, all subnets hosted in a fabric site can be provisioned across every fabric edge node 326A-F in that fabric site. For example, if the subnet 10.10.10.0/24 is provisioned in a given fabric site, this subnet may be defined across all of the fabric edge nodes 326A-F in that fabric site, and endpoints located in that subnet can be placed on any fabric edge node 326A-F in that fabric. This can simplify IP address management and allow deployment of fewer but larger subnets. In some example embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 322, 324, and 326.

The enterprise network 300 can also include wired endpoints/devices 330A, 330C, 330D, and 330F and wireless endpoints 330B and 330E (collectively, 330). The wired endpoints 330A, 330C, 330D, and 330F can connect by wire to fabric edge nodes 326A, 326C, 326D, and 326F, respectively, and the wireless endpoints 330B and 330E can connect wirelessly to wireless access points 328B and 328E (collectively, 328), respectively, which in turn can connect by wire to fabric edge nodes 326B and 326E, respectively. One or more of endpoints 330 can be a server such as server 330F running one or more applications 340 that can be accessed via other endpoint devices 330.

In some example embodiments, Cisco Aironet® access points, Cisco Meraki® MR access points, and/or other Cisco DNA™-ready access points can operate as the wireless access points 328.

The endpoints 330 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 330 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some example embodiments, the network fabric 320 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 308 notifying the fabric control plane node(s) 310 of joins, roams, and disconnects by the wireless endpoints 330 such that the fabric control plane node(s) can have connectivity information about both wired and wireless endpoints in the network fabric 320, and can serve as the single source of truth for endpoints connected to the network fabric. For data plane integration, the WLC(s) 308 can instruct the fabric wireless access points 328 to form a SRv6 overlay tunnel to their adjacent fabric edge nodes 326. The AP SRv6 tunnel can carry segmentation and policy information to and from the fabric edge nodes 326, allowing connectivity and functionality identical or similar to that of a wired endpoint. When the wireless endpoints 330 join the network fabric 320 via the fabric wireless access points 328, the WLC(s) 308 can onboard the endpoints into the network fabric 320 and inform the fabric control plane node(s) 310 of the endpoints' Media Access Control (MAC) addresses. The WLC(s) 308 can then instruct the fabric wireless access points 328 to form SRv6 overlay tunnels to the adjacent fabric edge nodes 326. Next, the wireless endpoints 330 can obtain IP addresses for themselves via Dynamic Host Configuration Protocol (DHCP). Once that completes, the fabric edge nodes 326 can register the IP addresses of the wireless endpoint 330 to the fabric control plane node(s) 310 to form a mapping between the endpoints' MAC and IP addresses, and traffic to and from the wireless endpoints 330 can begin to flow.

In the example setting of FIG. 3, first mile connectivity or connection can be defined as the connection between any one of endpoint devices 330, the corresponding AP 328A or 328B and the corresponding WLC 326. The single point of failure problem mentioned above arises when either the AP to which an endpoint is connected fails or the WLC to which the AP or the endpoint is connected fails and currently, the amount of time it takes for a backup/remote WLC to take over the failed WLC or for the endpoint 330 to scan and find an alternative/neighboring AP takes a relatively long period of time that undermines deterministic service delivery.

FIGS. 4A-D describe examples of current packet header formats according to one aspect of the present disclosure.

Figure 4A:
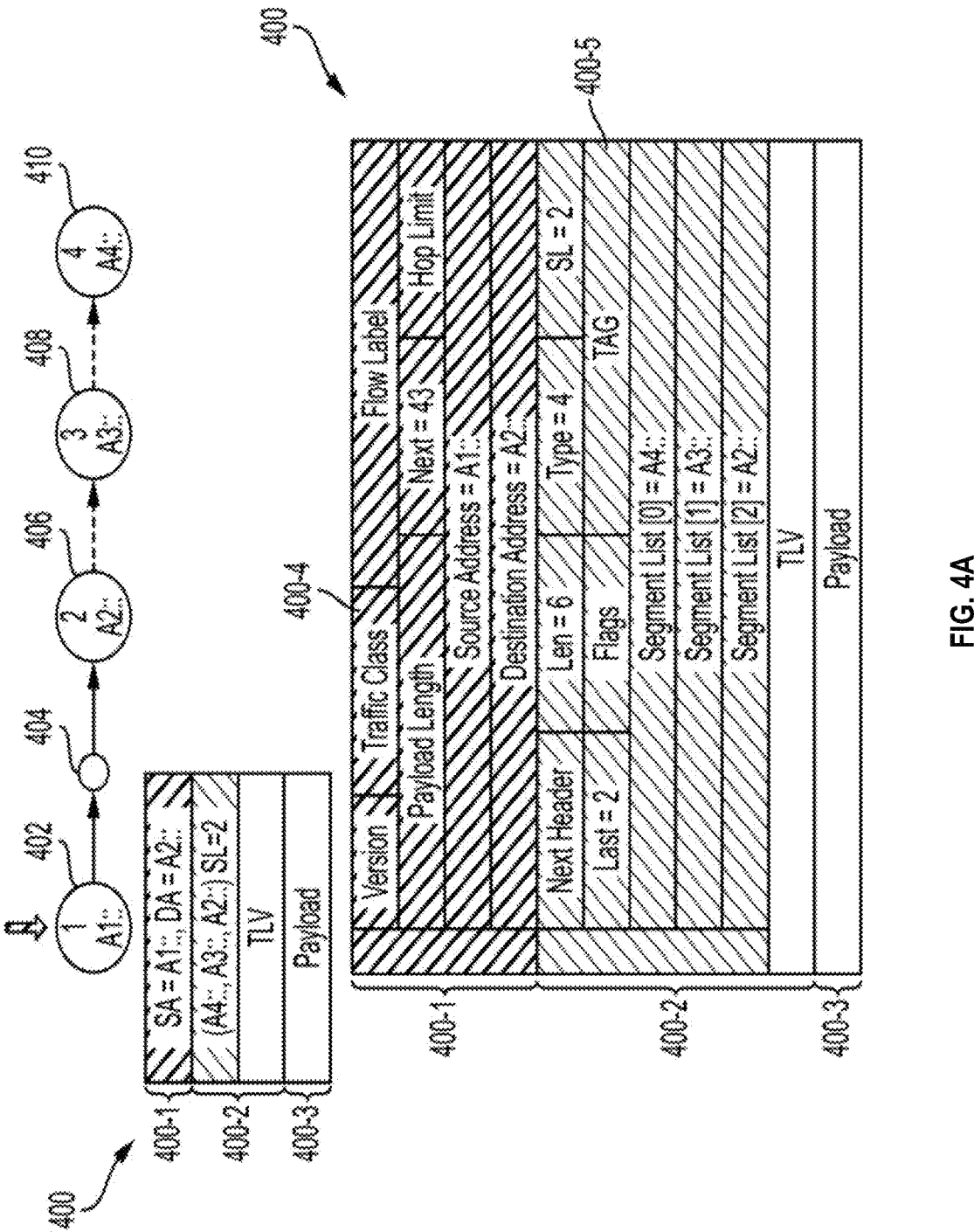
FIGS. 4A-4D describe examples of packet header formats according to one aspect of the present disclosure.

As shown in FIG. 4A, a data packet 400 originating from node 1 (e.g., device 106 of FIG. 1) is to traverse through nodes 404, 406 and 408 of a network, such as any one of the networks described with reference to FIGS. 1-3 to reach destination node 410. It is assumed that from among nodes 402, 404, 406, 408 and 410, node 404 is not SR capable but the remaining nodes are. Accordingly, SR capable nodes 402, 406, 408 and 410 have SRv6 Segments (SIDs) A1::, A2::, A3:: and A4::, respectively. Number of SR capable and SR-incapable nodes along the traversal path of packet 400 are not limited to that shown in FIG. 4 but may be more or less.

In one example, packet 400 may have an IPV6 header 400-1, SR header 400-2 and payload 400-3. FIG. 4 also illustrates packet 400 which is a blown up version of packet 400 to illustrate various information and fields included in IPV6 header 400-1 and SR header 400-2. In particular, IPv6 header 400-1 has a field 400-4, titled Traffic Class which can have, for example, 8 bits. This Traffic Class field 400-4 will be referenced below in describing the packet tracing mechanism. Furthermore, SR header 400-2 has a Tag field 400-5, which will also be referenced below in describing the packet tracing mechanism.

In creating SR Header (SRH) 400-2 at node 402, a reversed order of path to be traversed by data packet 400 to reach node 410 is included. This reverse order lists the SRv6 Segment (SID) A4:: of last/destination node 410 first, followed by the SRv6 Segment (SID) A3:: of intermediate node 408, followed by the SRv6 Segment (SID) A2:: of the first intermediate node 406. Since node 404 is not SR capable, no SRv6 Segment (SID) thereof is included in SRH 400-2. Furthermore, IP Destination Address (DA) is set to the SRv6 Segment (SID) of the next SR capable node 406 (i.e., A2::) in IPV6 header 400-1.

As will be described below, SR header 400-2 may have an additional field referred to as Type, Length, Value (TLV) field at the end to include information related to implementing the packet tracing mechanism of the present disclosure, as will be described below.

Figure 4B:
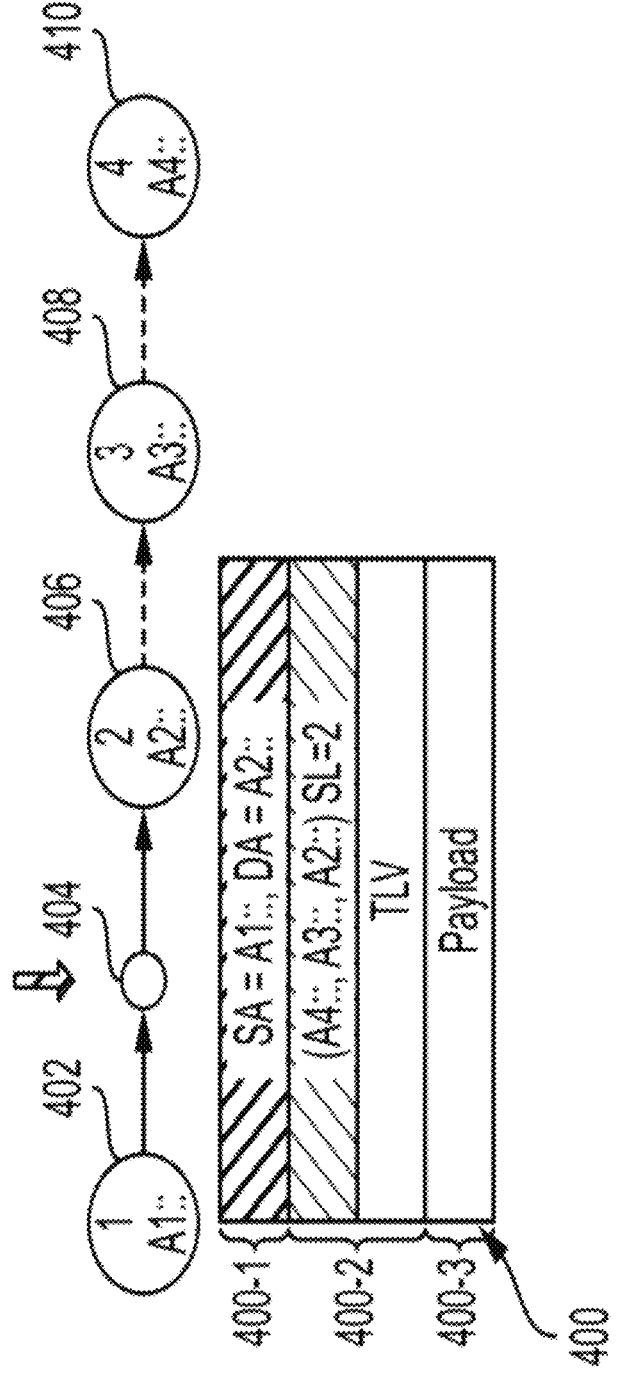

Next, packet 400 is forwarded to IP DA (e.g., first SRv6 SID) according to normal IPv6 forwarding mechanism. As shown in FIG. 4B, upon arriving at node 404, since node 404 is not SR capable, node 404 simply forwards data packet 400 to the next destination according to IPv6 forwarding and IPV6 DA without performing any SRH inspection or update.

Figure 4C:
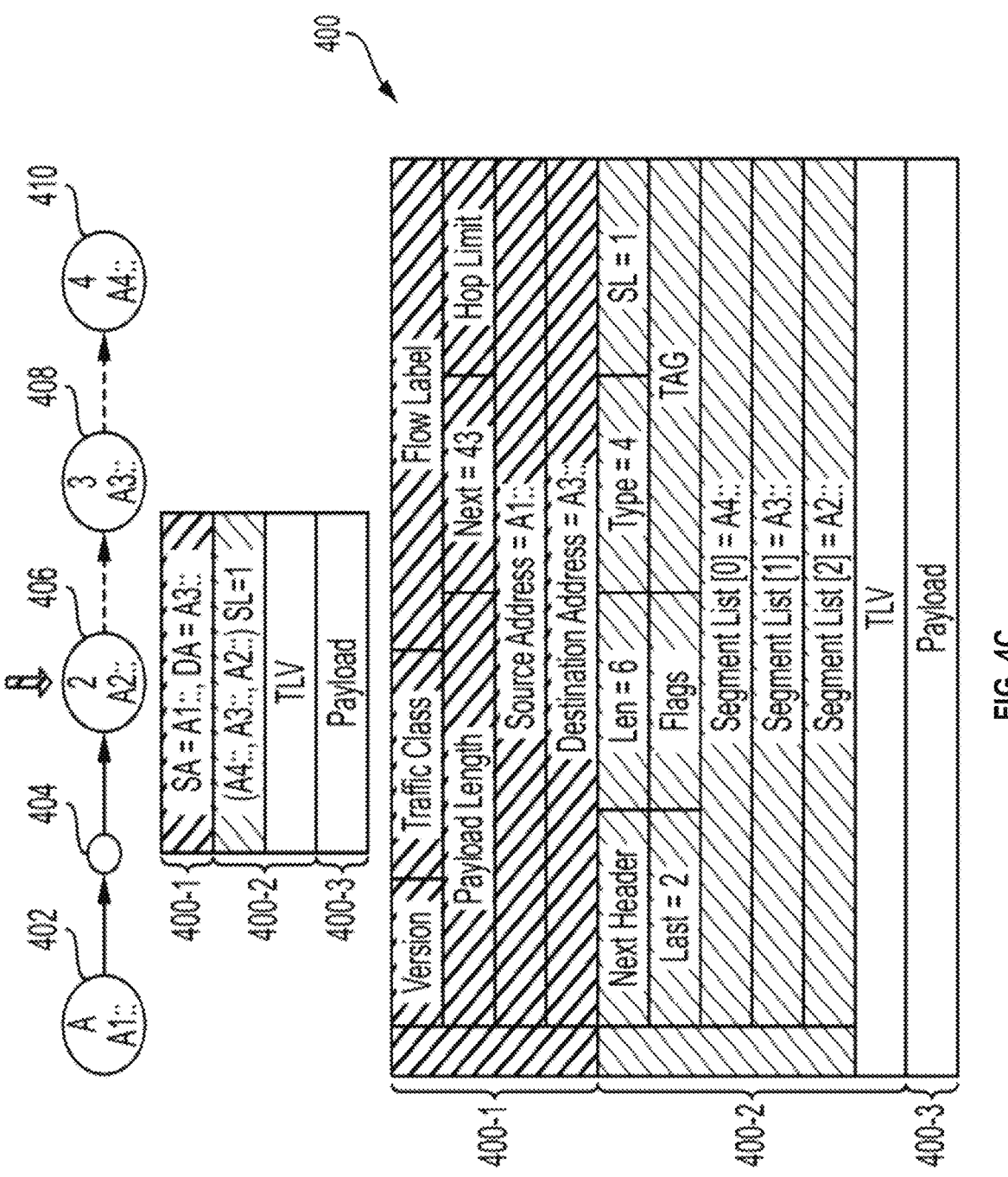

Next, packet 400 is forwarded to node 406. As shown in FIG. 4C, since node 406 is SR capable, node 406 inspects SRH 400-2 of packet 400 and if the number of segments (nodes) left in the path are greater than zero, it decreases the number of segments left by 1, updates the DA according to the next segment from the segment list (e.g., updates the DA to A3:: of node 408 according to the reverse list included in SRH header 400-2) and then forwards the packet according to the updated IPV6 DA, which is set to A3:: of node 408.

Next, packet 400 arrives at node 408 (which is SR capable) and the exact process as described above with reference to FIG. 4C is performed at node 408 and packet 400 is forwarded to destination node 410 according to updated IPV6 DA, which is set to A4:: of node 410.

Figure 4D:
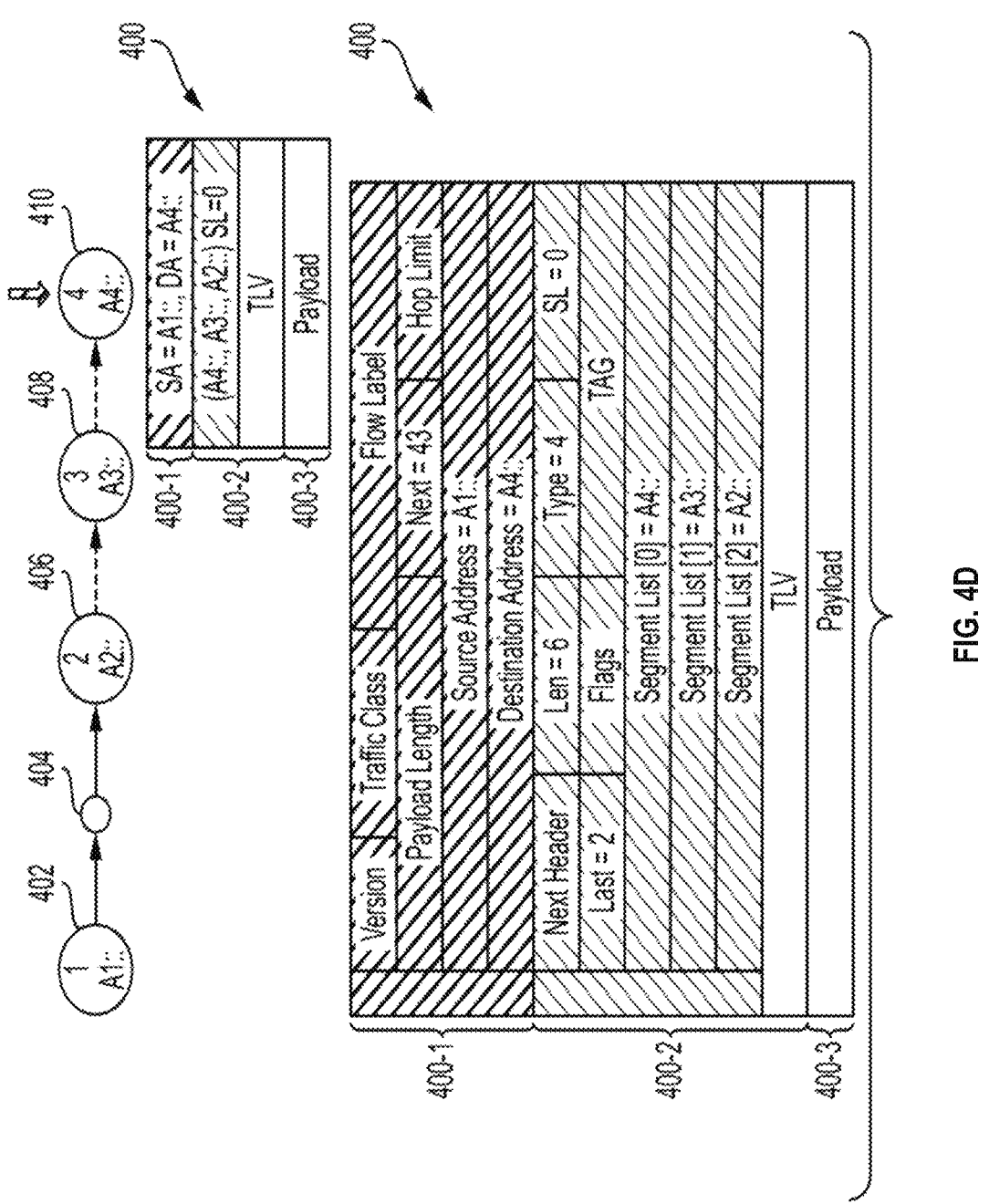

As shown in FIG. 4D, upon reaching destination node 410, node 410 again inspects the SRH 400-2 in a similar manner as nodes 406 and 408. In other words, node 410 inspects SRH 400-2 to determine if a number of segments left is greater than zero or not (if it is similar process as per FIG. 4B is performed). Since in this non-limiting example, node 410 is the last node, then number of segments left is equal to zero. Accordingly, node 410 removes IPv6 header 400-1 and SRH 400-2 and processes the payload according to any known or to be developed method.

With examples of segment routing headers and various types of networks in which segment routing may be implemented described with reference to FIGS. 1-4, the disclosure now turns to providing examples of modifications to segment routing headers for purposes of implementing packet tracing mechanism of the present disclosure.

Data packets communicated between two end devices such as devices 330A and device 330E of FIG. 3 or between device 330A and applications residing on network server 330F of FIG. 3, are typically encapsulated with appropriate routing headers at the originating node and then sent along a path according to the routing information such as the non-limiting address list of nodes described above with reference to FIGS. 4A-D and SR header 400-2.

The present disclosure provides systems and methods for enabling packet path tracing (PT) in large diameter networks that would otherwise exceed a hop limit imposed by hardware edit-depth limitations. In particular, the present disclosure shows a method for updating a PT-enabled packet header for transmission of information between a source node, a sink node, and a plurality of midpoint nodes between the source node and the sink node by an encapsulation method (e.g., "PT Encapsulation and Copy" (PEC) method) that allows extension of a quantity of Midpoint Compressed Data (MCD) that can be recorded within the packet header across many hops, thereby enabling path tracing across larger diameter networks. At present, for example, the MCD without the encapsulation protocol described herein may only have room for H hops worth of information collected across H midpoints. However, many networks in the real world can exceed H midpoints, where H can be upwards of 20 midpoints or more. As such, the encapsulation method described herein is directed to extending the amount of MCD that may be collected for path tracing across large-diameter networks.

Figure 5:
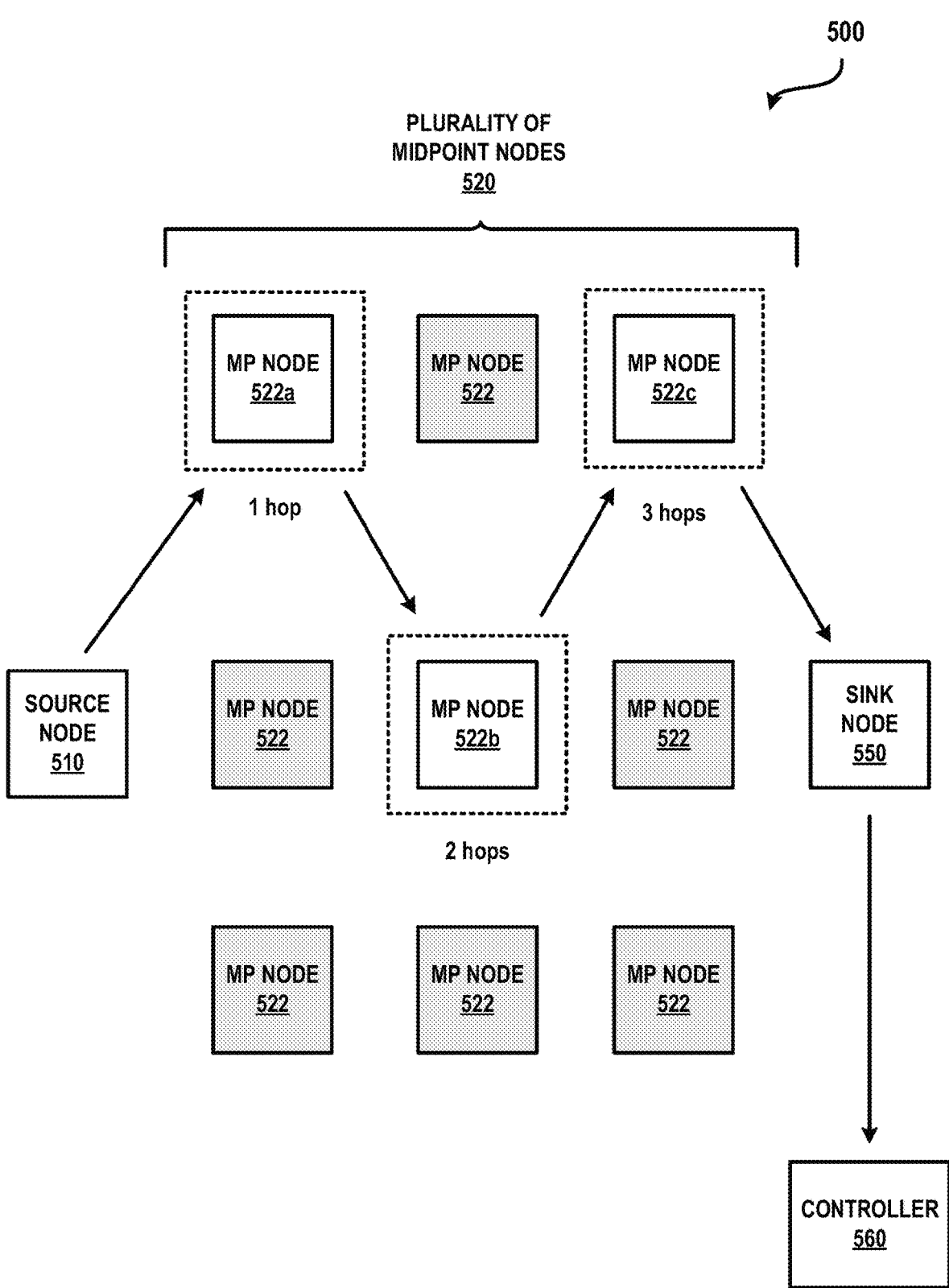
FIG. 5 illustrates an example network including a source node, a plurality of midpoint nodes, and a sink node for path tracing according to aspects of the present disclosure.

With reference to FIG. 5, an example network 500 includes a source node 510, a plurality of midpoint nodes 520, and a sink node 550. The source node 510 can send a path tracing (PT) enabled packet (e.g., data packet 400 of FIGS. 4A-4C) having a packet header to a first midpoint node 522a of a plurality of midpoint nodes 520, which can add a first midpoint compressed data (MCD) entry to the packet header and forward the PT-enabled packet onward to a second midpoint node 522b of the plurality of midpoint nodes 520. This is referred to herein as a "hop". Once received, the second midpoint node 522b can similarly add a second MCD entry to the packet header and forward the PT-enabled packet onward to a third midpoint node 522c of the plurality of midpoint nodes 520, completing a second hop. Similarly, the third midpoint node 522c can add a third MCD entry to the packet header and forward the PT-enabled packet onward to another midpoint node, or a sink node 550 as shown, completing a third hop. Each midpoint node 522 of the plurality of midpoint nodes 520 encountered by the packet adds a respective MCD entry to the packet header. Further, the sink node 550 can communicate with a controller 560 that forwards the PT-enabled packet to a final destination; with respect to various embodiments discussed in further detail herein, the controller 560 can be operable for receiving path tracing information present in the packet header of the PT-enabled packet and combining the path tracing information to provide the full path information.

An example packet header 600 of a PT-enabled packet is shown in FIG. 6 and can include the following: an IPV6 header 620, a hop-by-hop (IPv6 HbH-PT) header 640, a segment routing header (SRH) 660, and an SRH PT-TLV header 680 (which can be part of the SRH and can be used to record PT information of the Source Node)s, all of which have allocated sections within the PT probe packet organized by how many bits each section requires.

The IPV6 header 620 can include, in an example embodiment, at least four 32-bit "rows" (where each row includes 32 bits, or 4 bytes) that include information such as a source address, a destination address, and a payload length field.

The IPV6 HbH-PT header 640 can include an MCD stack 642 including MCD for path tracing (e.g., enough to allocate an MCD entry for each respective midpoint node 522 encountered across a plurality of hops). In some implementations, the MCD stack 642 is empty when leaving the source node 510, and collects a respective MCD entry (which can be around the size of 3 bytes) from each respective midpoint node 522 encountered by the packet between the source node 510 and the sink node 550.

The MCD stack 642 maintains MCD about each midpoint node 522 encountered by the packet and thus enables path tracing across a plurality of "hops" from the source node 510 to the sink node 550. The MCD maintained within the MCD stack 642 can include one or more MCD entries, where each respective MCD entry is associated with an associated midpoint node 522 of the plurality of midpoint nodes 520 encountered by the packet. Each MCD entry can include values that would be useful in tracing the path of the packet across a plurality of hops, such as a midpoint node identifier (e.g., 12 bits), an interface load (e.g., 4 bits), and a time-stamp (e.g., 8 bits); in one example implementation, a size of a respective MCD entry for each respective "hop" can be 3 bytes, however note that in some embodiments each respective MCD entry and the capacity of the MCD stack 642 may be of a different size and can include other types of information.

At present, the quantity of "hops" or encounters with midpoint nodes that can be recorded by the packet for path tracing is limited by the length of the PT headers to ensure that the MCD fits within an edit-depth (horizon) of hardware of each respective midpoint node; for example, some current hardware limitations can only allow H "hops" of MCD picked up from H midpoints between the source node and the sink node.

The SRH 660 can include a "next header" field as shown. Following the SRH 660, the packet header 600 can include the SH PT-TLV header 680 that includes path tracing information of the source node.

Figure 7:
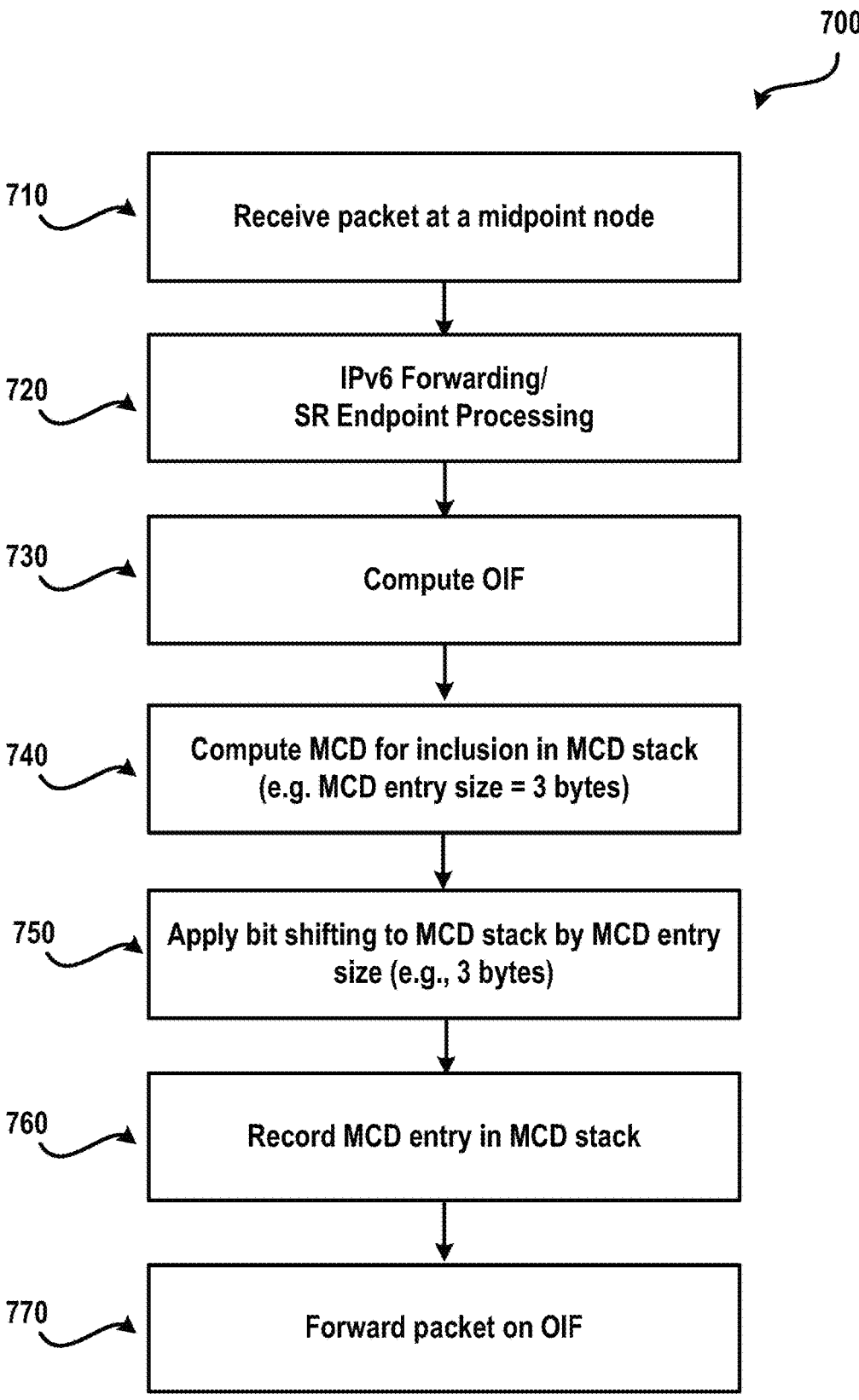
FIG. 7 shows a method for updating a path-tracing enabled packet header according to aspects of the present disclosure.
Figure 9A:
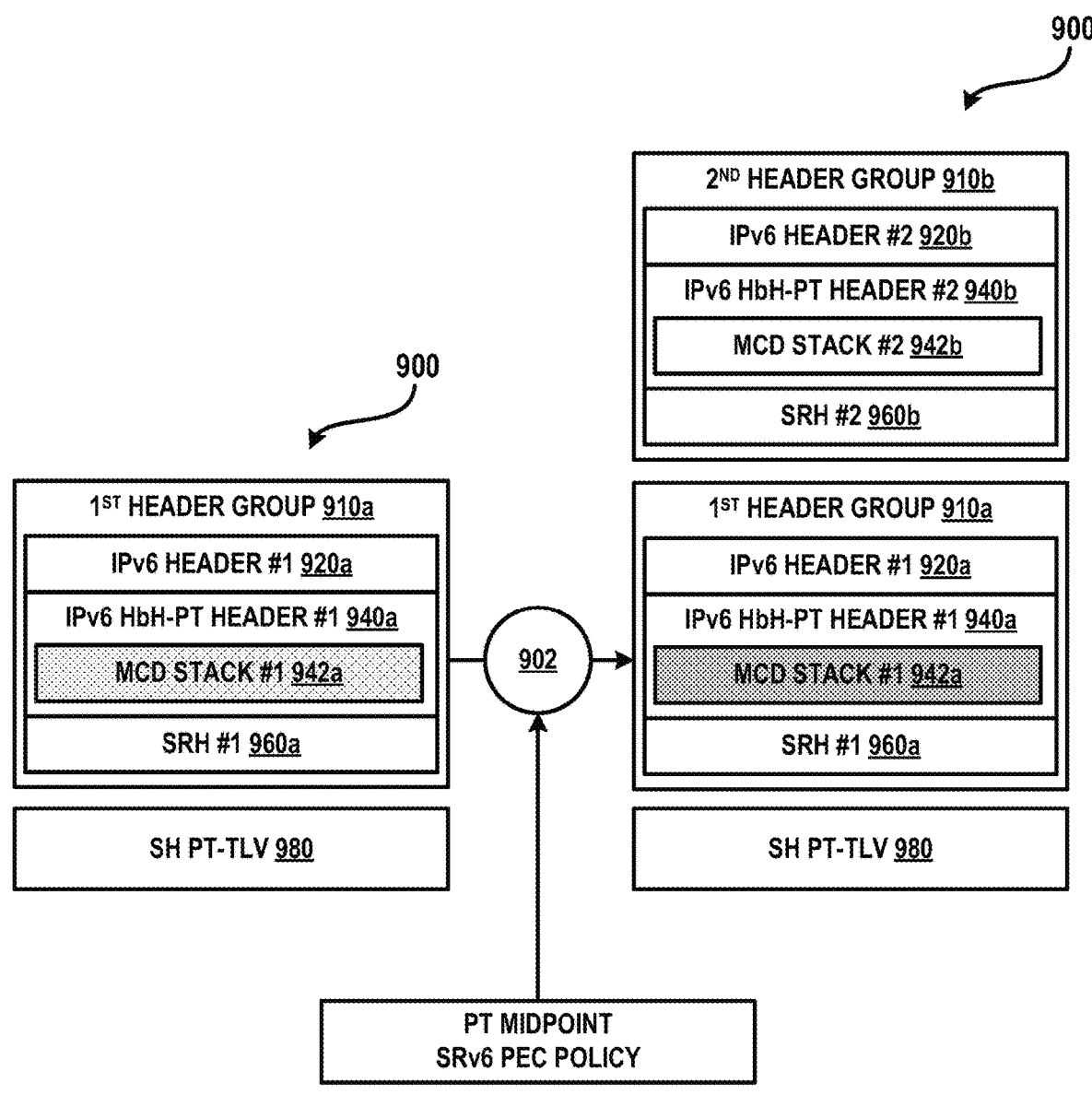

FIG. 7 shows a method 700 for updating the MCD stack 642 of the packet header 600 of the PT-enabled packet, without the encapsulation protocol discussed starting in FIG. 9A.

At step 710 of the method 700, a midpoint node 522 of the plurality of midpoint nodes 520 receives the PT-enabled packet.

At step 720 of the method 700, the midpoint node 522 applies an IPV6 forwarding (or SR Endpoint processing) operation.

At step 730 of the method 700, the midpoint node 522 computes an outgoing interface (OIF) for eventual forwarding of the packet.

At step 740 of the method 700, the midpoint node 522 computes an MCD entry for inclusion in the MCD stack 642 of the packet header 600; usually having a size of 3 bytes, however other embodiments are contemplated in which the MCD entry can have more or less than 3 bytes of MCD data.

At step 750 of the method 700, the midpoint node 522 applies a bit-shifting operation to the MCD stack 642 by the size of the MCD entry (e.g., if the MCD entry is 3 bytes large, then the bit-shifting operation should "shift" each bit recorded within the MCD stack by 3 bytes). This step can result in the first few bits or bytes of the MCD stack 642 being set to zero and with all other data within the MCD stack 642 being shifted to the "right". This operation is illustrated in subsequent FIGS. 8A-8D which will be explained in greater detail below.

At step 760 of the method 700, the midpoint node 522 writes or otherwise records the MCD entry in the MCD stack 642 at the first few bits or bytes of the MCD stack 642 that were previously set to "zero".

At step 770 of the method 700, the midpoint node 522 can forward the packet onward over the outgoing interface to another midpoint node 522 of the plurality of midpoint nodes 520 or the sink node 550.

At each "hop" (e.g., at each midpoint node 522 encountered), upon receiving a PT packet including the packet header 600, the midpoint node 522 can apply a bit shift operation to shift each bit of the MCD stack to the "right" by a fixed quantity of bits in order to clear a sufficient number of bits in order to write its own MCD entry to the packet header 600 at the MCD stack 642, as discussed above with reference to step 740 of method 700. Continuing with the examples outlined herein, if the MCD entry is 3 bytes large, the midpoint node 522 can shift each bit of the MCD stack 642 to the "right" by 3 bytes to clear the first 3 bytes of the MCD stack 642 prior to writing their MCD entry at the first 3 bytes of the MCD stack 642.

FIGS. 8A-8D show an example MCD stack 800 being sent from a source node (e.g., source node 510) and updated across two hops. FIG. 8A shows the example MCD stack 800 being empty upon leaving the source node 510; in FIG. 8A, hexadecimal values are shown for each "byte" of the MCD stack 800 representing each bit being set to zero (in the examples shown, the hexadecimal value "0x00" represents 8 bits, corresponding with binary "00000000").

FIG. 8B shows the example MCD stack 800 after a single hop and having a first MCD entry 810 recorded by a first midpoint node 522a (FIG. 5). In the example shown, the first MCD entry 810 includes three bytes of information and is represented at the first three bytes of the example MCD stack 800 (e.g., bytes 0, 1 and 2)

FIG. 8C shows the example MCD stack 800 during a second hop at a second midpoint node 522b (FIG. 5)

following application of a bit-shifting operation that shifts each bit of the example MCD stack 800 by a set quantity; the set quantity can correspond with a size of a second MCD entry 820 (FIG. 8D) to be added by the second midpoint node 522b. In the example shown, the size of the second MCD entry 820 is three bytes; as such, the first three bytes (e.g., bytes 0, 1 and 2) of the example MCD stack 800 are represented with hexadecimal values "0x00" having been intentionally cleared by the bit-shifting operation. The next three bytes (e.g., bytes 3, 4, and 5) hold the first MCD entry 810 having been shifted to the "right" by three bytes during the bit-shifting operation.

FIG. 8D shows the example MCD stack 800 after the second midpoint node 522b writes the second MCD entry 820 at the first three bytes (e.g., bytes 0, 1 and 2) of the example MCD stack 800. As shown, at the end of the second hop, the example MCD stack 800 includes the second MCD entry 820 at the first three bytes (e.g., bytes 0, 1 and 2) and the first MCD entry 810 at the next three bytes (e.g., bytes 3, 4, and 5).

As the packet is passed along the plurality of midpoint nodes 520, each midpoint node 522 of the plurality of midpoint nodes 520 applies the bit-shifting operation and adds its own MCD entry according to method 700 of FIG. 7 and as shown in FIGS. 8A-8D discussed above.

One problem with current PT technologies is that the MCD stack which is pre-allocated by the source node 510 based on the hardware edit-depth of the midpoint nodes 520 in the network 500, can reach maximum capacity relatively quickly, thereby limiting how many "hops" can be recorded for path tracing. In particular, path tracing can be limited by how much MCD can be included within the edit-depth of the midpoint nodes. As such, embodiments of the present disclosure are directed to providing a system and associated methods for extending a quantity of hops that can be captured for path tracing.

With reference to FIGS. 9A and 9B, a PT-enabled packet having a packet header 900 can leave the source node 510 (FIG. 5) formatted similarly to the packet header 600 shown in FIG. 6. The packet header 900 is shown having a first header group 910a including a first IPv6 header 920a, a first IPV6 HbH-PT header 940a, a first SRH 960a, and a SRH PT-TLV header 980. The first IPv6 HbH-PT header 940a can include a first MCD stack 942a that is empty (e.g., populated entirely by "0"s at each respective bit) when leaving the source node 510. The first MCD stack 942a can be of a conventional size; in one example implementation the first MCD stack 942a can be 36 bytes in size.

Similar to method 700 outlined above with respect to FIG. 7, the first midpoint node 522a can receive the packet having the packet header 900 from the source node 510, and can add a first MCD entry (having an MCD entry size g) to the MCD stack 942a at the first g available bytes (e.g., starting at the "top left" as shown in FIGS. 8A-8D), and forward the packet having the packet header 900 with the first MCD stack 942a onward.

The next recipient can be the second midpoint node 522b; the second midpoint node 522b can receive the packet having the packet header 900 from the first midpoint node 522a. Likewise, the second midpoint node 522b can add a second MCD entry including g bits to the first MCD stack 942a at the first g bits of the first MCD stack 942a; however, in some embodiments, the second midpoint node 522b can shift each bit of the first MCD stack 942a to the "right" by g bits prior to writing the second MCD entry at the first g bits as discussed above with reference to FIGS. 8A-8D. The second midpoint node 522b can then forward the packet having the packet header 900 with the first MCD stack 942a having been updated onward. This process may continue until the first MCD stack 942a reaches capacity.

As discussed, the edit depth of some hardware components of midpoint nodes can limit how much "editable" space can be allocated for MCD, limiting path tracking options by limiting how many "hops" can be recorded. As such, with reference to FIGS. 9A and 9B, upon receipt of the packet having the first header group 910a, a PT Encapsulation and Copy (PEC) enabled midpoint node 902 (which can be any midpoint node 522 of the plurality of midpoint nodes 520 shown in FIG. 5) can determine if the first MCD stack 942a of the packet header 900 is full. In some embodiments, the MCD entries for each midpoint node 522 can be 3 bytes large and the first MCD stack 942a can be 36 bytes large; in this scenario the first MCD stack 942a could be full after 12 hops, however note that this is one specific example and that the MCD and MCD stacks could be of sizes suited to the specific network.

Upon identifying that the first MCD stack 942a is full, the PEC-enabled midpoint node 902 can implement the encapsulation protocol that adds an encapsulation to the packet header 900 such that the previously-collected MCD entries are retained within the packet header 900 while providing a new updated MCD stack within the hardware edit-depth. The encapsulation protocol can be implemented at the PEC-enabled midpoint node 902 that can be operable for updating the packet header 900 according to an encapsulation method outlined herein.

As shown in FIGS. 9A and 9B, the PEC-enabled midpoint node 902 can add a second header group 910b to the packet header 900; this results in the second header group 910b defining an outer nest and the first header group 910a defining an inner nest. The second header group 910b includes a second IPv6 header 920b (e.g., an n$^{th}$ IPv6 header, where n=2, however n can be any reasonable number such that n∈ℕ * as will be discussed in greater detail below), a second IPv6 HbH-PT header 940b, and a second SRH 960b. The second header group 910b is placed at the beginning of the packet header 900 such that it is within the expected edit-depth of the plurality of midpoint nodes 520. Note that in some embodiments, the SRH PT-TLV header 980 can remain unduplicated at the end of the packet header 900. The second IPv6 HbH-PT header 940b can include a second MCD stack 942b that is empty (e.g., populated entirely by "0"s at each respective bit). The second MCD stack 942b can be of a conventional size; in one example implementation the second MCD stack 942b can be of the same size as the first MCD Stack 942a. The PEC-enabled midpoint node 902 can copy the contents of the first IPv6 header 920a into the second IPv6 header 920b and update a payload length field of the second IPV6 header 920b to reflect a new length of the packet. The PEC-enabled midpoint node 902 can further copy the contents of the first SRH 960a into the second SRH 960b and update a "next header" field of the second SRH 960b to reflect encapsulation (e.g., the "next header" field of the second SRH 960b can be updated to include the value "41" per RFC 2473). The packet still follows the same path to the destination as the PEC-enabled midpoint node 902 copies the first IPV6 header 920a and first SRH 960a from the original packet. Hence, the packet header 900 as updated will still have the same destination address, differentiated services code point (DSCP), and SRH Segment Identifier (SID) List (which specifies which midpoint nodes 902 should be encountered by the packet). Further, it is important to note that after adding the second header group 910b, the packet will still follow the same path because the second IPV6 header 920b and the second SRH 960b of the second header group 910b include the same information originally specified in the first IPV6 header 920a and the first SRH 960a of the first header group 910a including the same destination address, DSCP/Traffic Class and SRH SID List. The solution addresses the edit-depth limitation of current hardware as the packet header 900 will be always at the same depth in the packet; the MCD collected in the packet header 900 can be combined to measure the full path (any number of hops).

Following generation and population of the second header group 910b as shown, the PEC-enabled midpoint node 902 can apply the steps 720-770 of method 700 discussed above to add an MCD entry to the second MCD stack 942b and forward the packet including the packet header 900 onward to another node.

Figure 10:
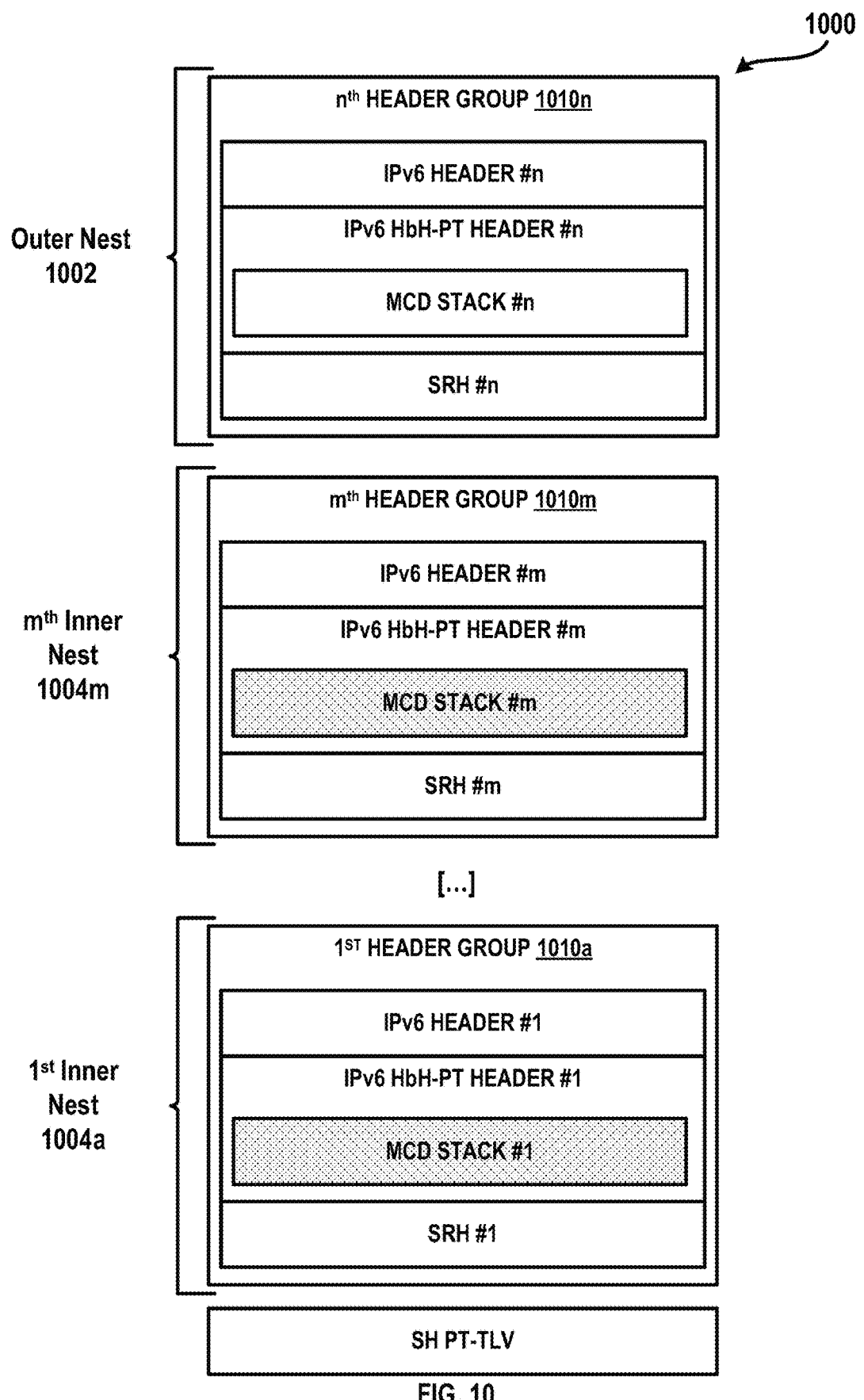
FIG. 10 shows path-tracing enabled packet header with multiple encapsulations according to aspects of the present disclosure.

This encapsulation protocol can be applied any suitable number of times in order to record MCD information across any suitable number of hops. FIG. 10 shows an example packet header 1000 that features multiple encapsulations, including a first header group 1010a defining a first inner nest 1004a, an m$^{th}$ header group 1010m being an m$^{th}$ inner nest 1004m, and an n$^{th}$ header group 1010n being an outer nest 1002 (where n=m+1 and where m∈ℕ *).

FIGS. 11A-11C show a generalized method 1100 for path-tracing including hop-limit extension by the encapsulation protocol discussed above to the network 500 of FIG. 5 having the source node 510, the plurality of midpoint nodes 520 including the PEC-enabled midpoint node 902 (shown in FIG. 9A, where the PEC-enabled midpoint node 902 is a midpoint node 522 of the plurality of midpoint nodes 520 of FIG. 5), and the sink node 550.

Figure 12A:
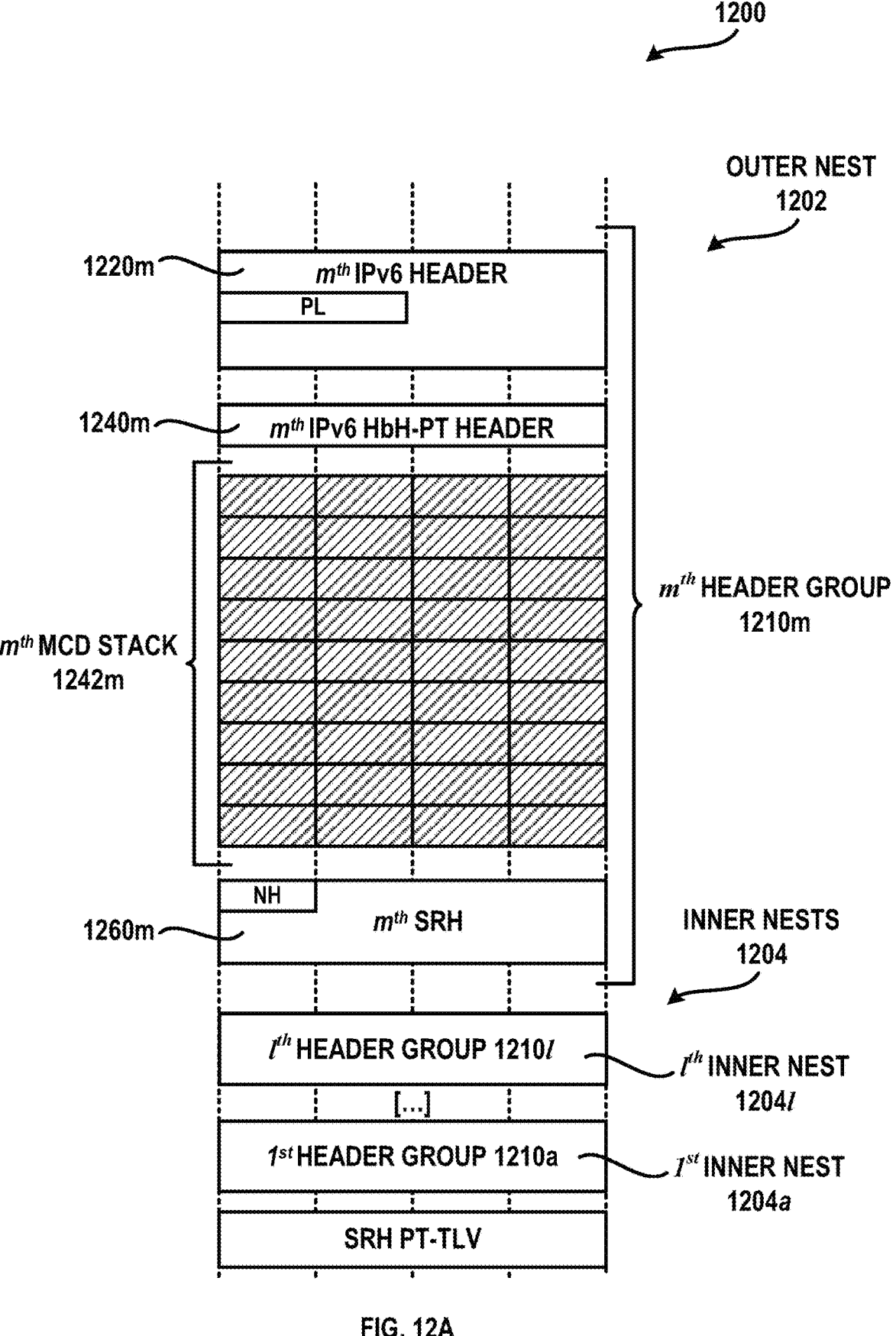
FIGS. 12A-12C show sequential updating of a path-tracing enabled packet header with multiple encapsulations according to aspects of the present disclosure.

A first step 1102 of method 1100 can include collecting, at a first stack of a first hop-by-hop header of a first header group of a packet, a set of hop-by-hop information across a plurality of nodes within a network that are encountered by the packet along a path of the packet. With reference to FIG. 12A, the first stack can be an m$^{th}$ MCD stack 1242m where m∈ℕ *, the first hop-by-hop header can be an m$^{th}$ IPV6 HbH-PT header 1240m and the first header group can be an m$^{th}$ header group 1210m.

With reference to FIGS. 11A and 12A-12C, at step 1104 of method 1100, the PEC-enabled midpoint node 902 (FIG. 9A) can receive the PT-enabled packet including a packet header 1200 shown in FIG. 12A. As shown, the packet header 1200 as received at the PEC-enabled midpoint node 902 can include the m$^{th}$ header group 1210m defining the outer nest 1202, the m$^{th}$ header group 1210m having an m$^{th}$ IPv6 header 1220m, the m$^{th}$ IPV6 HbH-PT header 1240m having the m$^{th}$ MCD stack 1242m, and an m$^{th}$ SRH 1260m. The m$^{th}$ header grouping 1210m can be a first header grouping (where m=1), or the m$^{th}$ header grouping 1210m can be the "newest" of m total header groupings; in the case of the latter, the packet header 1200 can also include l header groups including an l$^{th}$ header group 1210l defining a set of l inner nests 1204 encapsulated by the outer nest 1202, including a first header group 1210a defining a first inner nest 1204a and an l$^{th}$ header group 1210l defining an l$^{th}$ inner nest 1204l, where l=m−1. The first header grouping 1210a can include the original headers sent from the source node 510 including the first IPV6 header, the first IPV6 HbH-PT header having the first MCD stack, the first SRH, and a single SH PR-TLV header at the very end of the packet header 1200. As such, if the m$^{th}$ header group 1210m is the outer nest 1202, then the previous l header groupings $1210\text{l}-1210a$ are encapsulated as l inner nests 1204 relative to the outer nest 1202, where l=m−1 and where m∈ℕ * as shown in FIG. 12A.

At step 1106 of method 1100, the PEC-enabled midpoint node 902 can determine that the first stack of the first hop-by-hop header has reached a maximum capacity. With reference to FIG. 12A, the PEC-enabled midpoint node 902 can assess a capacity of the $m^{th}$ MCD stack 1242m. In this example, the PT-enabled packet has encountered a plurality of midpoint nodes 522 and collected MCD from each respective midpoint node 522 such that the $m^{th}$ MCD stack 1242m is full; the PEC-enabled midpoint node 902 can determine that the $m^{th}$ MCD stack 1242m has reached a maximum capacity.

At step 1108 of method 1100, the PEC-enabled midpoint node 902 can generate a second IPv6 header of the second header group to become a top-most header of the packet. In particular, the second header group can be an $n^{th}$ header group 1210n and the second IPV6 header can be a $n^{th}$ IPV6 header 1220n, and upon determining that the $m^{th}$ MCD stack 1242m has reached its capacity, the PEC-enabled midpoint node 902 can "push" or otherwise generate the $n^{th}$ IPv6 header 1220n of the $n^{th}$ header group 1210n to become the "top-most" header in the packet (e.g., a new outer IPv6 header of the outer nest 1202) such that the $m^{th}$ IPv6 header 1220m becomes an $m^{th}$ inner IPV6 header (of an $m^{th}$ inner nest 1204m) that follows the new outer IPv6 header, where n=m+1 and where m∈ℕ * as shown in FIG. 12B.

At step 1110 of method 1100, the PEC-enabled midpoint node 902 can then copy the contents of the first IPv6 header of the first header group (e.g., the $m^{th}$ IPv6 header 1220m of the $m^{th}$ header group 1210m) into the second IPV6 header of the second header group (e.g, the $n^{th}$ IPv6 header 1220n of the $n^{th}$ header group 1210n) which becomes the new outer IPV6 header.

Figure 12B:
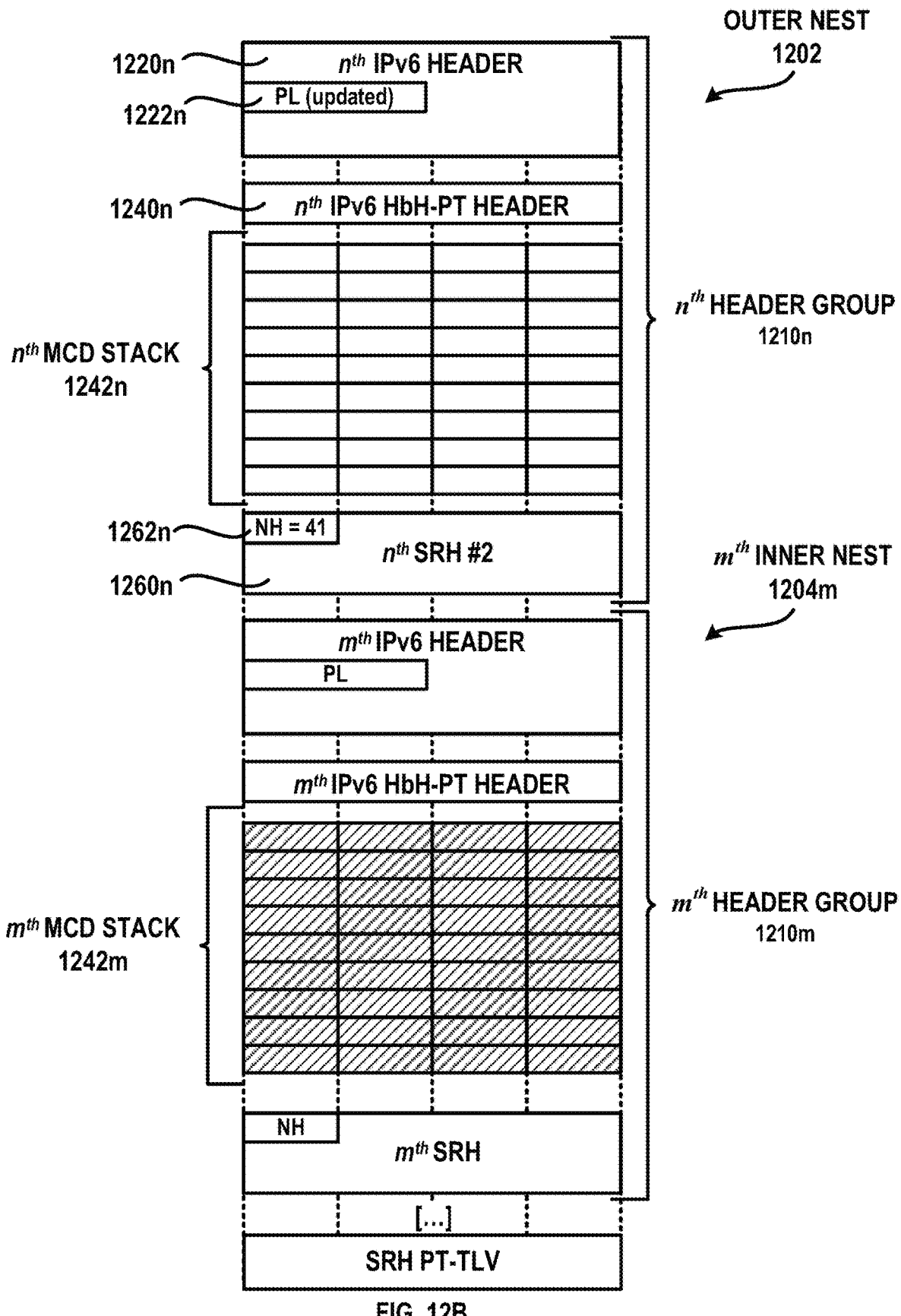

At step 1112 of method 1100, the PEC-enabled midpoint node 902 can then update a payload length field of the second IPV6 header to reflect a new length of the packet; in particular, with reference to FIG. 12B, the PEC-enabled midpoint node 902 can update a payload length field 1222m of the $n^{th}$ IPv6 header 1220n to reflect a new payload length value (e.g., that would result from extension of the packet header upon application of the encapsulation protocol).

At step 1114 of method 1100, the PEC-enabled midpoint node 902 can append a second hop-by-hop header of the second header group to the second IPv6 header such that the second hop-by-hop header directly follows the second IPV6 header, the second hop-by-hop header including a second stack, the second stack including a plurality of bits. With reference to FIG. 12B, the second hop-by-hop header can be an $n^{th}$ IPV6 HbH-PT header 1240n and the second stack can be an $n^{th}$ MCD stack 1242n. In particular, the PEC-enabled midpoint node 902 can append the $n^{th}$ IPV6 HbH-PT header 1240n of the $n^{th}$ header grouping 1210n (e.g., a new outer IPV6 HbH-PT header of the outer nest 1202) including the $n^{th}$ MCD stack 1242n (e.g., a new outer MCD stack of the outer nest 1202) to follow the $n^{th}$ IPv6 header 1220n such that the $m^{th}$ IPV6 HbH-PT header 1240m becomes an $m^{th}$ inner IPV6 HbH-PT header (of the $m^{th}$ inner nest 1204m) that directly follows the $m^{th}$ inner IPV6 header (e.g, the $m^{th}$ IPv6 header 1220m of the $m^{th}$ inner nest 1204m) and the $m^{th}$ MCD stack 1242m becomes an $m^{th}$ inner MCD stack of the $m^{th}$ inner nest 1204m as shown in FIG. 12B.

At step 1116 of method 1100, the PEC-enabled midpoint node 902 can then set each bit of the plurality of bits of the second stack (e.g., the $n^{th}$ MCD stack 1242n) to hold a "zero" value as shown in FIG. 12B.

At step 1118 of method 1100, the PEC-enabled midpoint node 902 can then append a second segment routing header of the second header group to the second hop-by-hop header such that the second segment routing header directly follows the second hop-by-hop header. With reference to FIG. 12B, the second segment routing header can be an $n^{th}$ SRH 1260n; as such, the PEC-enabled midpoint node 902 can append an $n^{th}$ SRH 1260n of the nah header grouping 1210n (e.g., a new outer SRH of the outer nest 1202) to follow the $n^{th}$ IPv6 HbH-PT header 1240n such that the $m^{th}$ SRH 1260m becomes an $m^{th}$ inner SRH of the $m^{th}$ inner nest 1204m that follows the $m^{th}$ IPV6 HbH-PT header of the $m^{th}$ inner nest 1204m as shown in FIG. 12B.

At step 1120 of method 1100, the PEC-enabled midpoint node 902 can copy contents of a first segment routing header of the first header group into the second segment routing header of the second header group. With reference to FIGS. 12A and 12B, the first segment routing header can be the $m^{th}$ SRH 1260m; as such, the PEC-enabled midpoint node 902 can copy the contents of the $m^{th}$ SRH 1260m into the $n^{th}$ SRH 1260n (e.g., the outer SRH of the outer nest 1202).

At step 1122 of method 1100, the PEC-enabled midpoint node 902 can update a next header field of the second segment routing header to indicate encapsulation of the first header group by the second header group. As shown in FIG. 12B, in some embodiments, the PEC-enabled midpoint node 902 can update the "next header" field of the $n^{th}$ SRH 1260n to 41 (reflecting IPv6 encapsulation per RFC 2473).

FIG. 12B shows an example packet header 1200 following the conclusion of step 1122 of method 1100 in which the $m^{th}$ header group 1210m is the $m^{th}$ inner nest 1204m encapsulated by the $n^{th}$ header group 1210n which is the outer nest 1202. If m≥2, the $m^{th}$ header grouping 1210m similarly encapsulates the $l^{th}$ header grouping 1210l and so forth as discussed above with reference to FIG. 12A. The SH PR-TLV header can stay at the end as shown in FIG. 12B, as it may not need to be updated by midpoint nodes during transmission.

Figure 12C:
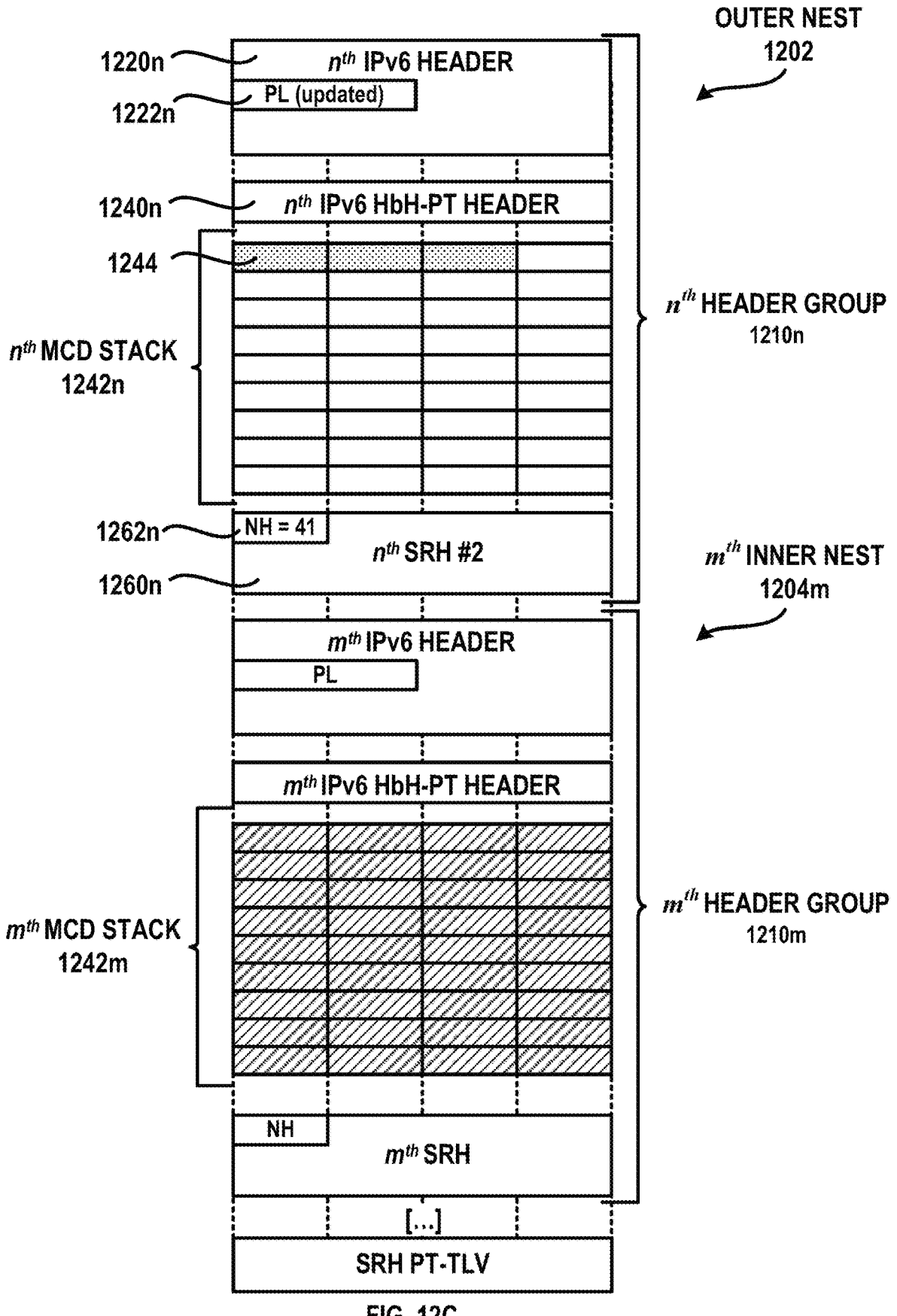

Once step 1122 of method 1100 is complete, with additional reference to FIG. 12C, the PEC-enabled midpoint node 902 can update the second stack of the second header group to include a hop-by-hop entry of the set of hop-by-hop information for the midpoint node of the plurality of nodes, and can forward the packet including the second header group encapsulating the first header group to an additional node of the plurality of nodes. The PEC-enabled midpoint node 902 accomplishes this by adding the hop-by-hop entry (shown in the figures as MCD entry 1244) to the $n^{th}$ MCD stack 1242n (the new outer MCD stack of the outer nest 1202) and forwarding the packet to a further midpoint node. Because the new outer MCD stack is within the edit-depth, further midpoints can continue to add their own MCD entries without issue while retaining the MCD entries from previous midpoint nodes.

At step 1124 of the method 1100, the PEC-enabled midpoint node 902 applies an IPV6 Forwarding/SR endpoint processing operation.

At step 1126 of the method 1100, the PEC-enabled midpoint node 902 computes an outgoing interface (OIF) for eventual forwarding of the packet.

At step 1128 of the method 1100, the PEC-enabled midpoint node 902 can compute the hop-by-hop entry of the set of hop-by-hop information for inclusion in the second stack, the hop-by-hop entry being associated with the midpoint node and including g bits. In particular, the PEC-enabled midpoint node 902 can compute the MCD entry 1244 of size g for inclusion in the $n^{th}$ MCD stack 1242n of the packet header 1200; which can have a size of g=3 bytes, however other embodiments are possible in which the MCD entry 1244 can have more or less than 3 bytes of MCD data.

At step 1130 of the method 1100, the PEC-enabled midpoint node 902 can apply a bit-shifting operation to shift each bit of the plurality of bits of the second stack by g bits such that a first g bits of the second stack are set to hold a "zero" value. In particular, the PEC-enabled midpoint node 902 can apply the bit-shifting operation to the n$^{th}$ MCD stack 1242n by g bits (the size of the MCD entry 1244; e.g., if the MCD entry 1244 is 3 bytes large, then the bit-shifting operation should "shift" each bit recorded within the n$^{th}$ MCD stack 1242n by 3 bytes or 24 bits). This step can result in the first g bits of the n$^{th}$ MCD stack 1242n being set to zero and with all other data within n$^{th}$ MCD stack 1242n being shifted to the "right". The bit-shifting operation is also discussed in greater detail above with reference to FIGS. 8A-8D.

At step 1132 of the method 1100, the PEC-enabled midpoint node 902 can write or otherwise record the hop-by-hop entry at the first g bits of the second stack. FIG. 12C shows the MCD entry 1244 recorded in the MCD stack 1242n at the first few bits or bytes of the MCD stack 1242n that were previously set to "zero".

At step 1134 of the method 1100, the PEC-enabled midpoint node 902 can forward the packet including the second header group encapsulating the first header group to an additional node of the plurality of nodes. This can include sub-steps including submitting the packet for path tracing processing to a controller and transmitting the packet to a destination. The PEC-enabled midpoint node 902 can forward the packet onward over the outgoing interface to another midpoint node 522 of the plurality of midpoint nodes 520 or the sink node 550 based on the outgoing interface.

Alternatively, if at step 1106 of the method 1100 the PEC-enabled midpoint node 902 determines that the m$^{th}$ MCD stack 1242m has not reached its capacity, then the PEC-enabled midpoint node 902 applies steps 1124-1134 of method 1100 discussed above, but in terms of the m$^{th}$ MCD stack 1242m as modified below:

At step 1124 of the method 1100, the PEC-enabled midpoint node 902 applies an IPV6 Forwarding/SR end-point processing operation.

At step 1126 of the method 1100, the PEC-enabled midpoint node 902 computes an outgoing interface (OIF) for eventual forwarding of the packet.

At step 1128 of the method 1100, the PEC-enabled midpoint node 902 computes an MCD entry of size g for inclusion in the m$^{th}$ MCD stack 1242m of the packet header 1200; usually having a size of g=3 bytes, however other embodiments are possible in which the MCD entry can have more or less than 3 bytes of MCD data.

At step 1130 of the method 1100, the PEC-enabled midpoint node 902 applies a bit-shifting operation to the m$^{th}$ MCD stack 1242m by g bits (the size of the MCD entry; e.g., if the MCD entry is 3 bytes large, then the bit-shifting operation should "shift" each bit recorded within the m$^{th}$ MCD stack 1242m by 3 bytes or 24 bits). This step can result in the first g bits of m$^{th}$ MCD stack 1242m being set to zero and with all other data within m$^{th}$ MCD stack 1242m being shifted to the "right".

At step 1132 of the method 1100, the PEC-enabled midpoint node 902 writes or otherwise records the MCD entry in the MCD stack 1242m at the first few bits or bytes of the MCD stack 1242m that were previously set to "zero".

At step 1134 of the method 1100, the PEC-enabled midpoint node 902 can forward the packet onward to another midpoint node 522 of the plurality of midpoint nodes 520 or the sink node 550.

The system can then continue applying steps 1102-1134 of method 1100 at further midpoint nodes encountered by the packet and updating the packet header 1200 as needed. If necessary, the system can continue adding encapsulations (e.g., as new header groupings that become new outer nests and push previous outer nests to become inner nests) until the packet reaches the sink node 550, thus extending the amount of path tracing data that can be obtained.

At step 1136 of method 1100, after the packet header 1220 reaches the sink node 550, the controller 560 in communication with the sink node 550 can receive the packet (e.g., packet 400) with the entire packet header 1220 (including all header groups 1210 having all MCD stacks 1242). At step 1138 of method 1100, the controller 560 can combine the PT information from all MCD stacks 1242 resulting in the full path information for the packet.

For example, if the n$^{th}$ MCD stack 1242n becomes full, but there are still more "hops" to be made, then a future PEC-enabled midpoint node can apply the encapsulation protocol outlined in steps 1102-1132 of method 1100 to add an o$^{th}$ IPv6 header that becomes a new outer IPv6 header of the outer nest 1202 (where o=n+1), an of IPV6 HbH-PT header that becomes a new outer IPV6 HbH-PT header of the outer nest 1202 having an o$^{th}$ MCD stack that becomes a new outer MCD stack, and an o$^{th}$ SRH that becomes a new outer SRH of the outer nest 1202 with information from the n$^{th}$ IPv6 header 1220n and the n$^{th}$ SRH 1260n being copied into the o$^{th}$ IPV6 header and the o$^{th}$ SRH. The o$^{th}$ IPV6 header is updated to reflect a new payload length and the o$^{th}$ SRH is updated to reflect encapsulation within the "next header" field of the o$^{th}$ SRH. The n$^{th}$ IPV6 header 1220n becomes an n$^{th}$ inner IPV6 header of the inner nests 1204, the n$^{th}$ IPV6 HbH-PT header 1240n becomes an n$^{th}$ inner IPV6 HbH-PT header of the inner nests 1204 having the n$^{th}$ MCD stack 1242n that becomes the n$^{th}$ inner MCD stack, and the n$^{th}$ SRH 1260 becomes the n$^{th}$ inner SRH of the inner nests 1204. The m$^{th}$ IPV6 header, the m$^{th}$ IPV6 HbH-PT header, the m$^{th}$ MCD stack and the m$^{th}$ SRH are still retained as "inner" headers within the inner nests 1204 as discussed above and as shown in FIGS. 12A-12C. The SH PR-TLV header can remain unmodified following the "oldest" inner headers (e.g., the first header group 1210a).

As such, upon reaching the sink node 550, the packet header 1220 can include the outer nest 1202 including the outer IPV6 header, the outer IPV6 HbH-PT header having the outer MCD stack, and the outer SRH being the "newest" headers. The packet header 1220 can also include the inner nests 1204 including one or more inner IPv6 headers, one or more inner IPV6 HbH-PT headers each having a respective inner MCD stack, and one or more inner SRHs that are sequentially nested with respect to one another as shown in FIGS. 12A-12C.

Having described various examples of networks and packet tracing mechanism with reference to FIGS. 1-12C, the disclosure now turns to describing example embodiments of devices and system components that can be utilized to implement routers, nodes and controllers of networks described above.

Figure 13A:
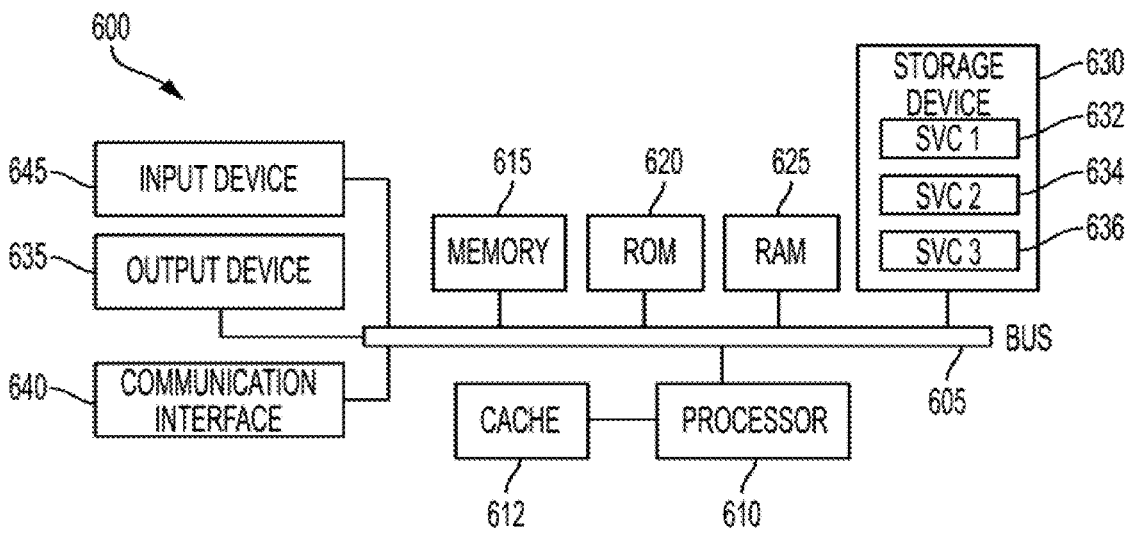
FIGS. 13A and 13B illustrate examples of systems in accordance with one aspect of the present disclosure.
Figure 13B:
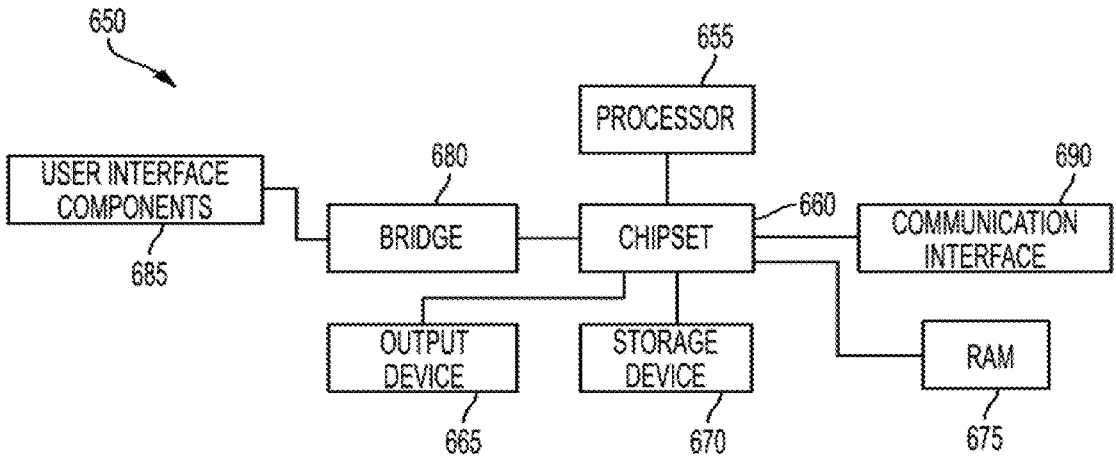

FIGS. 13A and 13B illustrate examples of systems in accordance with one aspect of the present disclosure.

FIG. 13A illustrates an example of a bus computing system 1300 wherein the components of the system are in electrical communication with each other using a bus 1305.

The computing system 1300 can include a processing unit (CPU or processor) 1310 and a system bus 1305 that may couple various system components including the system memory 1315, such as read only memory (ROM) 1320 and random access memory (RAM) 1325, to the processor 1310. The computing system 1300 can include a cache 1312 of high-speed memory connected directly with, in close proximity to, or integrated as part of the processor 1310. The computing system 1300 can copy data from the memory 1315, ROM 1320, RAM 1325, and/or storage device 1330 to the cache 1312 for quick access by the processor 1310. In this way, the cache 1312 can provide a performance boost that avoids processor delays while waiting for data. These and other modules can control the processor 1310 to perform various actions. Other system memory 1315 may be available for use as well. The memory 1315 can include multiple different types of memory with different performance characteristics. The processor 1310 can include any general purpose processor and a hardware module or software module (service), such as service (SVC) 1 1332, service (SVC) 2 1334, and service (SVC) 3 1336 stored in the storage device 1330, configured to control the processor 1310 as well as a special-purpose processor where software instructions are incorporated into the actual processor design. The processor 1310 may essentially be a completely self-contained computing system, containing multiple cores or processors, a bus, memory controller, cache, etc. A multi-core processor may be symmetric or asymmetric.

To enable user interaction with the computing system 1300, an input device 1345 can represent any number of input mechanisms, such as a microphone for speech, a touch-protected screen for gesture or graphical input, keyboard, mouse, motion input, speech and so forth. An output device 1335 can also be one or more of a number of output mechanisms known to those of skill in the art. In some instances, multimodal systems can enable a user to provide multiple types of input to communicate with the computing system 1300. The communications interface 1340 can govern and manage the user input and system output. There may be no restriction on operating on any particular hardware arrangement and therefore the basic features here may easily be substituted for improved hardware or firmware arrangements as they are developed.

The storage device 1330 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1330 can include the software modules/services SVC 1332, SVC 1334, SVC 1335 for controlling the processor 1310. Other hardware or software modules are contemplated. The storage device 1330 can be connected to the system bus 1305. In some embodiments, a hardware module that performs a particular function can include a software component stored in a computer-readable medium in connection with the necessary hardware components, such as the processor 1310, bus 1305, output device 1335, and so forth, to carry out the function.

FIG. 13B illustrates an example architecture for a chipset computing system 1350 that can be used in accordance with an embodiment. The computing system 1350 can include a processor 1355, representative of any number of physically and/or logically distinct resources capable of executing software, firmware, and hardware configured to perform identified computations. The processor 1355 can communicate with a chipset 1350 that can control input to and output from the processor 1355. In this example, the chipset 1350 can output information to an output device 1365, such as a display, and can read and write information to storage device 1370, which can include magnetic media, solid state media, and other suitable storage media. The chipset 1350 can also read data from and write data to RAM 1375. A bridge 1380 for interfacing with a variety of user interface components 1385 can be provided for interfacing with the chipset 1350. The user interface components 1385 can include a keyboard, a microphone, touch detection and processing circuitry, a pointing device, such as a mouse, and so on. Inputs to the computing system 1350 can come from any of a variety of sources, machine generated and/or human generated.

The chipset 1350 can also interface with one or more communication interfaces 1390 that can have different physical interfaces. The communication interfaces 1390 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 1355 analyzing data stored in the storage device 1370 or the RAM 1375. Further, the computing system 1350 can receive inputs from a user via the user interface components 1385 and execute appropriate functions, such as browsing functions by interpreting these inputs using the processor 1355.

It will be appreciated that computing systems 1300 and 1350 can have more than one processor 1310 and 1355, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In another embodiment, instead of using a map-in-map view, the map can be initially zoomed into one primary cluster of interest (e.g. the most important one based on some criteria), while a printed list of the other primary clusters is shown next to the map. This list can be ranked by each cluster's importance, such as by number of sites in each cluster or average health score of each cluster.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method, comprising:

collecting, at a first stack of a first hop-by-hop header of a first header group of a packet, a set of hop-by-hop information across a plurality of nodes within a network that are encountered by the packet along a path of the packet, wherein the first stack is capable of storing a maximum capacity of hop-by-hop information;

determining, at a midpoint node of the plurality of nodes, that the first stack of the first hop-by-hop header has reached the maximum capacity;

generating, based on the determination that the first stack of the first hop-by-hop header has reached the maximum capacity, a second header group that encapsulates the first header group, wherein generating the second header group includes:

generating a second IPV6 header of the second header group to become a top-most header of the packet;

appending a second hop-by-hop header of the second header group to the second IPV6 header such that the second hop-by-hop header directly follows the second IPV6 header, the second hop-by-hop header including a second stack, the second stack including a plurality of bits;

updating the second stack of the second header group to include a hop-by-hop entry of the set of hop-by-hop information for the midpoint node of the plurality of nodes; and forwarding the packet including the second header group encapsulating the first header group to an additional node of the plurality of nodes to collect hop-by-hop information after the first stack has reached the maximum capacity.

2. The method of claim 1, further comprising:

copying contents of a first IPV6 header of the first header group into the second IPv6 header of the second header group; and updating a payload length field of the second IPV6 header to reflect a new length of the packet;

wherein the second header group includes a destination address originally specified within the first header group.

3. The method of claim 1, further comprising:

copying contents of a first segment routing header of the first header group into a second segment routing header of the second header group; and updating a next header field of the second segment routing header to indicate encapsulation of the first header group by the second header group;

wherein the second header group includes a segment identifier list originally specified within the first header group.

4. The method of claim 1, wherein the step of updating the second stack to include a hop-by-hop entry of the set of hop-by-hop information for the midpoint node of the plurality of nodes further includes:

computing a hop-by-hop entry of the set of hop-by-hop information for inclusion in the second stack, the hop-by-hop entry being associated with the midpoint node and including g bits;

shifting each bit of the plurality of bits of the second stack by g bits such that a first g bits of the second stack are set to hold a "zero" value; and recording the hop-by-hop entry at the first g bits of the second stack.

5. The method of claim 1, further comprising:

computing an outgoing interface for forwarding of the packet to the additional node of the plurality of nodes; and forwarding, over the outgoing interface, the packet including the first header group and the second header group to the additional node of the plurality of nodes.

6. The method of claim 1, further comprising:

receiving, at a controller in communication with the network, the packet including the first header group and the second header group; and combining, at the controller, information from the second stack of the packet and the first stack of the packet resulting in full path information for the packet.

7. The method of claim 1, wherein the second header group is within an edit-depth of each node of the plurality of nodes.

8. The method of claim 1, further comprising:

receiving, at the additional node of the plurality of nodes, the packet including the second header group encapsulating the first header group;

computing a hop-by-hop entry of the set of hop-by-hop information for inclusion in the second stack, the hop-by-hop entry being associated with the additional node and including g bits;

shifting each bit of the plurality of bits of the second stack by g bits such that the first g bits of the second stack are set to hold a "zero" value and such that one or more previous hop-by-hop entries from one or more previous nodes of the plurality of nodes are shifted by g bits; and recording the hop-by-hop entry at the first g bits of the second stack.

9. The method of claim 1, wherein the first stack and the second stack are each a midpoint compressed data (MCD) stack, wherein the set of hop-by-hop information includes MCD data, and wherein the hop-by-hop entry is an MCD entry.

10. The method of claim 1, further comprising:

determining, at a further midpoint node of the plurality of nodes, that the second stack of the second hop-by-hop header has reached a maximum capacity;

generating, based on the determination that the second stack of the second hop-by-hop header has reached the maximum capacity, a third header group that encapsulates the second header group, wherein generating the third header group includes:

generating a third IPV6 header of the third header group to become the top-most header of the packet;

appending a third hop-by-hop header of the third header group to the third IPV6 header such that the third hop-by-hop header directly follows the third IPV6 header, the third hop-by-hop header including a third stack, the third stack including a plurality of bits;

setting each bit of the plurality of bits of the third stack to hold a "zero" value; and appending a third segment routing header of the third header group to the third hop-by-hop header such that the third segment routing header directly follows the third hop-by-hop header;

updating the third stack of the third header group to include a hop-by-hop entry of the set of hop-by-hop information for the further midpoint node of the plurality of nodes; and forwarding the packet including the third header group encapsulating the second header group to an additional node of the plurality of nodes, the second header group encapsulating the first header group;

wherein the third header group is within an edit-depth of each node of the plurality of nodes.

11. A system, comprising:

a midpoint node of a plurality of nodes of a network, the midpoint node including a processor in communication with a memory and a network interface, the memory including instructions, which, when executed, cause the processor to:

receive, at the processor, a packet including a first hop-by-hop header of a first header group, the first hop-by-hop header including a first stack that includes hop-by-hop information across a plurality of nodes within a network that are encountered by the packet along a path of the packet, wherein the first stack is capable of storing a maximum capacity of hop-by-hop information;

determine, at the processor, that the first stack of the first hop-by-hop header has reached the maximum capacity;

generate, based on the determination that the first stack of the first hop-by-hop header has reached the maximum capacity, a second header group that encapsulates the first header group, the memory further including instructions, which, when executed, cause the processor to:

generate a second IPV6 header of the second header group to become a top-most header of the packet;

append a second hop-by-hop header of the second header group to the second IPV6 header such that the second hop-by-hop header directly follows the second IPV6 header, the second hop-by-hop header including a second stack, the second stack including a plurality of bits;

update, at the processor, the second stack of the second header group to include a hop-by-hop entry of the set of hop-by-hop information for the midpoint node; and forward, over the network interface, the packet including the second header group encapsulating the first header group to an additional node of the plurality of nodes to collect hop-by-hop information after the first stack has reached the maximum capacity.

12. The system of claim 11, the memory of the midpoint node further including instructions, which, when executed, further cause the processor of the midpoint node to:

copy contents of a first IPV6 header of the first header group into the second IPV6 header of the second header group; and update a payload length field of the second IPV6 header to reflect a new length of the packet;

wherein the second header group includes a destination address originally specified within the first header group.

13. The system of claim 11, the memory of the midpoint node further including instructions, which, when executed, further cause the processor of the midpoint node to:

copy contents of a first segment routing header of the first header group into a second segment routing header of the second header group; and update a next header field of the second segment routing header to indicate encapsulation of the first header group by the second header group;

wherein the second header group includes a segment identifier list originally specified within the first header group.

14. The system of claim 11, the memory of the midpoint node further including instructions, which, when executed, further cause the processor of the midpoint node to:

compute a hop-by-hop entry of the set of hop-by-hop information for inclusion in the second stack, the hop-by-hop entry being associated with the midpoint node and including g bits;

shift each bit of the plurality of bits of the second stack by g bits such that a first g bits of the second stack are set to hold a "zero" value; and record the hop-by-hop entry at the first g bits of the second stack.

15. The system of claim 11, the memory of the midpoint node further including instructions, which, when executed, further cause the processor of the midpoint node to:

compute an outgoing interface for forwarding of the packet to the additional node of the plurality of nodes; and forward, over the outgoing interface, the packet including the first header group and the second header group to the additional node of the plurality of nodes.

16. The system of claim 11, the memory of the midpoint node further including instructions, which, when executed, further cause the processor of the midpoint node to:

receive, at a controller in communication with the network, the packet including the first header group and the second header group; and combine, at the controller, information from the second stack of the packet and the first stack of the packet resulting in full path information for the packet.

17. The system of claim 11, wherein the second header group is within an edit-depth of each node of the plurality of nodes.

18. The system of claim 11, further comprising an additional node of the plurality of nodes, the additional node including a processor in communication with a network interface and a memory, the memory of the additional node including instructions, which, when executed, further cause the processor of the additional node to:

receive, over the network interface of the additional node, the packet including the second header group encapsulating the first header group;

compute, at the processor of the additional node, a hop-by-hop entry of the set of hop-by-hop information for inclusion in the second stack, the hop-by-hop entry being associated with the additional node and including g bits;

shift, at the processor of the additional node, each bit of the plurality of bits of the second stack by g bits such that the first g bits of the second stack are set to hold a "zero" value and such that one or more previous hop-by-hop entries from one or more previous nodes of the plurality of nodes are shifted by g bits; and record, at the processor of the additional node, the hop-by-hop entry at the first g bits of the second stack.

19. The system of claim 11, wherein the first stack and the second stack are each a midpoint compressed data (MCD) stack, wherein the set of hop-by-hop information includes MCD data, and wherein the hop-by-hop entry is an MCD entry.

20. A non-transitory computer-readable storage medium having embodied thereon a program executable by a processor to perform a method for gesture-based skill search, the method comprising:

collecting, at a first stack of a first hop-by-hop header of a first header group of a packet, a set of hop-by-hop information across a plurality of nodes within a network that are encountered by the packet along a path of the packet, wherein the first stack is capable of storing a maximum capacity of hop-by-hop information;

determining, at a midpoint node of the plurality of nodes, that the first stack of the first hop-by-hop header has reached the maximum capacity;

generating, based on the determination that the first stack of the first hop-by-hop header has reached the maximum capacity, a second header group that encapsulates the first header group, wherein generating the second header group includes:

generating a second IPv6 header of the second header group to become a top-most header of the packet;

copying contents of a first IPV6 header of the first header group into the second IPV6 header of the second header group;

updating a payload length field of the second IPV6 header to reflect a new length of the packet;

appending a second hop-by-hop header of the second header group to the second IPV6 header such that the second hop-by-hop header directly follows the second IPV6 header, the second hop-by-hop header including a second stack, the second stack including a plurality of bits;

setting each bit of the plurality of bits of the second stack to hold a "zero" value; and appending a second segment routing header of the second header group to the second hop-by-hop header such that the second segment routing header directly follows the second hop-by-hop header;

copying contents of a first segment routing header of the first header group into the second segment routing header of the second header group; and updating a next header field of the second segment routing header to indicate encapsulation of the first header group by the second header group;

updating the second stack of the second header group to include a hop-by-hop entry of the set of hop-by-hop information for the midpoint node of the plurality of nodes; and forwarding the packet including the second header group encapsulating the first header group to an additional node of the plurality of nodes.

* * * * *